United States Patent
Li

(10) Patent No.: US 12,118,512 B2
(45) Date of Patent: Oct. 15, 2024

(54) TEMPORALLY DYNAMIC REFERENTIAL ASSOCIATION IN DOCUMENT COLLABORATION SYSTEMS

(71) Applicants: ATLASSIAN PTY LTD, Sydney (AU); ATLASSIAN US, INC., San Francisco, CA (US)

(72) Inventor: Shuai Li, Sunnyvale, CA (US)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 0 days.

(21) Appl. No.: 18/366,334

(22) Filed: Aug. 7, 2023

(65) Prior Publication Data

US 2024/0020643 A1  Jan. 18, 2024

Related U.S. Application Data

(63) Continuation of application No. 18/058,336, filed on Nov. 23, 2022, now Pat. No. 11,809,814, which is a continuation of application No. 17/643,546, filed on Dec. 9, 2021, now Pat. No. 11,556,894, which is a continuation of application No. 17/196,511, filed on Mar. 9, 2021, now Pat. No. 11,227,257.

(51) Int. Cl.
| | |
|---|---|
| G06F 40/169 | (2020.01) |
| G06F 40/106 | (2020.01) |
| G06F 40/134 | (2020.01) |
| G06Q 10/101 | (2023.01) |

(52) U.S. Cl.
CPC ......... *G06Q 10/101* (2013.01); *G06F 40/106* (2020.01); *G06F 40/134* (2020.01); *G06F 40/169* (2020.01)

(58) Field of Classification Search
CPC ... G06Q 10/101; G06F 40/169; G06F 40/106; G06F 40/134
See application file for complete search history.

(56) References Cited

U.S. PATENT DOCUMENTS

| | | |
|---|---|---|
| 8,966,362 B2 | 2/2015 | Smetters et al. |
| 2009/0164267 A1 | 6/2009 | Banatwala et al. |
| 2014/0279906 A1 | 9/2014 | Peintner |
| 2017/0083211 A1 | 3/2017 | Ramkumar et al. |
| 2017/0300483 A1 | 10/2017 | Devincenzi et al. |
| 2018/0123815 A1 | 5/2018 | Milvaney et al. |
| 2018/0189693 A1* | 7/2018 | Newhouse ......... G06Q 10/0631 |
| 2018/0189706 A1* | 7/2018 | Newhouse ....... G06Q 10/06316 |
| 2018/0189734 A1* | 7/2018 | Newhouse ............ G06F 16/25 |

(Continued)

*Primary Examiner* — Asher D Kells
(74) *Attorney, Agent, or Firm* — Alston & Bird LLP

(57) ABSTRACT

Various embodiments of the present invention provide methods, apparatuses, systems, computing devices, and/or the like that are configured to enable temporally dynamic referential association in document collaboration server systems. For example, certain embodiments of the present invention provide methods, apparatuses, systems, computing devices, and/or the like that are configured to perform temporally dynamic referential association in document collaboration server systems by using cross-temporal visual reference data objects, temporal visual reference data objects, cross-temporal referential association data objects, temporal referential association data objects, and administrator panel user interfaces.

20 Claims, 14 Drawing Sheets

(56) References Cited

U.S. PATENT DOCUMENTS

| | | |
|---|---|---|
| 2018/0197088 A1 | 7/2018 | Bonin et al. |
| 2020/0021564 A9 | 1/2020 | Brunn et al. |
| 2020/0050641 A1 | 2/2020 | Devincenzi et al. |
| 2021/0157613 A1 | 5/2021 | Jenkins et al. |

\* cited by examiner

PAGE INFORMATION

Pages / Pooya / Far Away

| | | |
|---|---|---|
| Title: | Far Away | |
| Author: | Pooya, Shoghi | Feb 15, 2021 |
| Last Changed by: | Pooya, Shoghi | Feb 15, 2021 |
| Tiny Link: (useful for email) | https://pooya1.atlassian.net/wiki/x/AQAH | |
| Export As: | Word - PDF | |
| Operations: | Copy | |

Hierarchy  1205

Parent Page
☐ Pooya

Labels  1204

There are no labels assigned to this page

Hot Referrers https://pooya1.atlassian.net/[ban]

@Disturb Schedule
Monday-Wednesday: David Jackson
1202

Wednesday-Friday: Joe Austin

Saturday-Sunday: Jessica Atkinson

Recent Changes  1203

| Time | Editor | |
|---|---|---|
| Feb 15, 2021 06:21 | Pooya, Shoghi | View Changes |
| Feb 15, 2021 06:21 | Pooya, Shoghi | View Changes |
| Feb 15, 2021 06:17 | Pooya, Shoghi | View Changes |
| Feb 15, 2021 06:15 | Pooya, Shoghi | |

View Page History

Roles:
@ Owner: Jack Abrams   1201

@ Legal: Stacy David

@ HR: Stephanie Aaron

FIG. 12

TEMPORALLY DYNAMIC REFERENTIAL ASSOCIATION IN DOCUMENT COLLABORATION SYSTEMS

CROSS-REFERENCE TO RELATED APPLICATIONS

This application is a continuation of U.S. Non-Provisional application Ser. No. 18/058,336 which was filed on Nov. 23, 2022, which application is a continuation of U.S. Non-Provisional application Ser. No. 17/643,546 which was filed on Dec. 9, 2021, which application is a continuation of U.S. Non-Provisional application Ser. No. 17/196,511 (now U.S. Pat. No. 11,227,257) and was filed on Mar. 9, 2021. Each of the aforementioned applications is hereby incorporated by reference herein in its entirety.

BACKGROUND

Various methods, apparatuses, and systems are configured to provide techniques for user interaction in document collaboration systems. Applicant has identified many deficiencies and problems associated with existing methods, apparatuses, and systems for user interaction in document collaboration systems. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable temporally dynamic referential association in document collaboration server systems. For example, certain embodiments of the present invention provide methods, apparatuses, systems, computing devices, and/or the like that are configured to perform temporally dynamic referential association in document collaboration server systems by using cross-temporal visual reference data objects, temporal visual reference data objects, cross-temporal referential association data objects, temporal referential association data objects, and administrator panel user interfaces.

In accordance with one aspect, a computer-implemented method is provided. In one embodiment, the computer-implemented method comprises: receive, from a client computing device, a cross-temporal referential association data object, wherein the cross-temporal referential association data object is generated by the client computing device based on a predefined cross-temporal referential input provided by an end user profile of the client computing device, and wherein the predefined cross-temporal referential input is associated with a first predefined cross-temporal referential input type designation of one or more predefined cross-temporal referential input type designations; query a cross-temporal referential mapping data object associated with the collaborative document data object to identify a designated cross-temporal document administrator user profile of the group of document administrator user profiles for the first predefined cross-temporal referential input type designation, wherein the cross-temporal referential mapping data object associates each predefined cross-temporal referential input type designation of the one or more predefined cross-temporal referential input type designations to a corresponding document administrator user profile of the group of document administrator user profiles; and transmit a cross-temporal visual conversion data object describing the designated cross-temporal document administrator user profile to the client computing device.

In accordance with another aspect, a computer program product is provided. The computer program product may comprise at least one computer-readable storage medium having computer-readable program code portions stored therein, the computer-readable program code portions comprising executable portions configured to: receive, from a client computing device, a cross-temporal referential association data object, wherein the cross-temporal referential association data object is generated by the client computing device based on a predefined cross-temporal referential input provided by an end user profile of the client computing device, and wherein the predefined cross-temporal referential input is associated with a first predefined cross-temporal referential input type designation of one or more predefined cross-temporal referential input type designations; query a cross-temporal referential mapping data object associated with the collaborative document data object to identify a designated cross-temporal document administrator user profile of the group of document administrator user profiles for the first predefined cross-temporal referential input type designation, wherein the cross-temporal referential mapping data object associates each predefined cross-temporal referential input type designation of the one or more predefined cross-temporal referential input type designations to a corresponding document administrator user profile of the group of document administrator user profiles; and transmit a cross-temporal visual conversion data object describing the designated cross-temporal document administrator user profile to the client computing device.

In accordance with yet another aspect, an apparatus comprising at least one processor and at least one memory including computer program code is provided. In one embodiment, the at least one memory and the computer program code may be configured to, with the processor, cause the apparatus to: receive, from a client computing device, a cross-temporal referential association data object, wherein the cross-temporal referential association data object is generated by the client computing device based on a predefined cross-temporal referential input provided by an end user profile of the client computing device, and wherein the predefined cross-temporal referential input is associated with a first predefined cross-temporal referential input type designation of one or more predefined cross-temporal referential input type designations; query a cross-temporal referential mapping data object associated with the collaborative document data object to identify a designated cross-temporal document administrator user profile of the group of document administrator user profiles for the first predefined cross-temporal referential input type designation, wherein the cross-temporal referential mapping data object associates each predefined cross-temporal referential input type designation of the one or more predefined cross-temporal referential input type designations to a corresponding document administrator user profile of the group of document administrator user profiles; and transmit a cross-temporal visual conversion data object describing the designated cross-temporal document administrator user profile to the client computing device.

In accordance with another aspect, a computer-implemented method is provided. In one embodiment, the computer-implemented method comprises: receiving, from a client computing device, a temporal referential association data object associated with an input cyclical time period designation of a plurality of cyclical time period designations, wherein the temporal referential association data object is generated by the client computing device based on a predefined temporal referential input provided by an end user profile of the client computing device, and wherein the interaction has occurred at a time period that is associated with the input cyclical time period designation; querying a temporal referential mapping data object associated with the collaborative document data object to identify a designated temporal document administrator user profile of the group of document administrator user profiles for the input cyclical time period designation, wherein the temporal referential mapping data object associates each cyclical time period designation of the plurality of cyclical time period designations to a corresponding document administrator user profile of the group of document administrator user profiles; and transmitting a temporal visual conversion data object describing the designated temporal document administrator user profile to the client computing device.

In accordance with another aspect, a computer program product is provided. The computer program product may comprise at least one computer-readable storage medium having computer-readable program code portions stored therein, the computer-readable program code portions comprising executable portions configured to: receive, from a client computing device, a temporal referential association data object associated with an input cyclical time period designation of a plurality of cyclical time period designations, wherein the temporal referential association data object is generated by the client computing device based on a predefined temporal referential input provided by an end user profile of the client computing device, and wherein the interaction has occurred at a time period that is associated with the input cyclical time period designation; query a temporal referential mapping data object associated with the collaborative document data object to identify a designated temporal document administrator user profile of the group of document administrator user profiles for the input cyclical time period designation, wherein the temporal referential mapping data object associates each cyclical time period designation of the plurality of cyclical time period designations to a corresponding document administrator user profile of the group of document administrator user profiles; and transmit a temporal visual conversion data object describing the designated temporal document administrator user profile to the client computing device.

In accordance with yet another aspect, an apparatus comprising at least one processor and at least one memory including computer program code is provided. In one embodiment, the at least one memory and the computer program code may be configured to, with the processor, cause the apparatus to: receive, from a client computing device, a temporal referential association data object associated with an input cyclical time period designation of a plurality of cyclical time period designations, wherein the temporal referential association data object is generated by the client computing device based on a predefined temporal referential input provided by an end user profile of the client computing device, and wherein the interaction has occurred at a time period that is associated with the input cyclical time period designation; query a temporal referential mapping data object associated with the collaborative document data object to identify a designated temporal document administrator user profile of the group of document administrator user profiles for the input cyclical time period designation, wherein the temporal referential mapping data object associates each cyclical time period designation of the plurality of cyclical time period designations to a corresponding document administrator user profile of the group of document administrator user profiles; and transmit a temporal visual conversion data object describing the designated temporal document administrator user profile to the client computing device.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 6A:
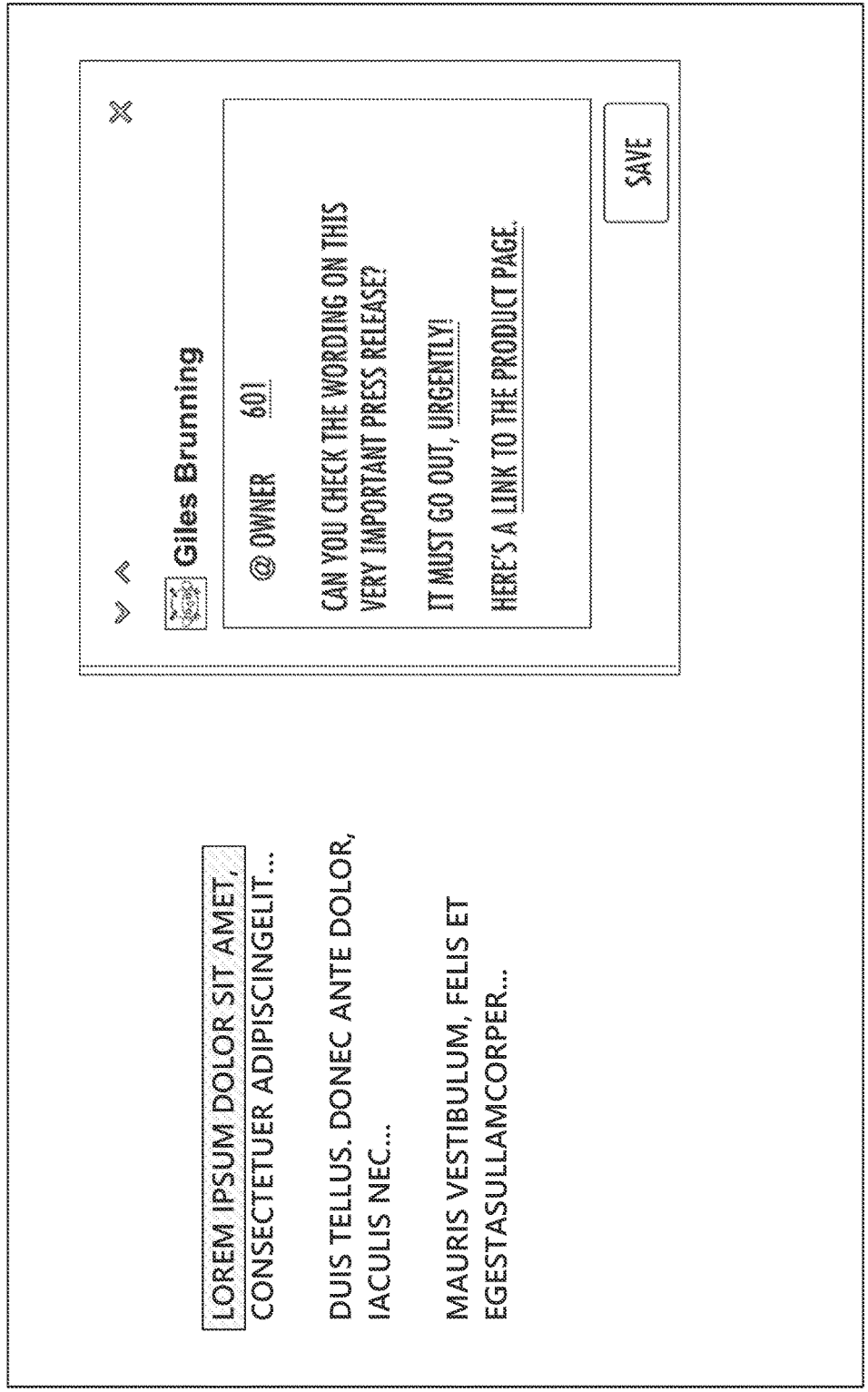
Figure 6B:
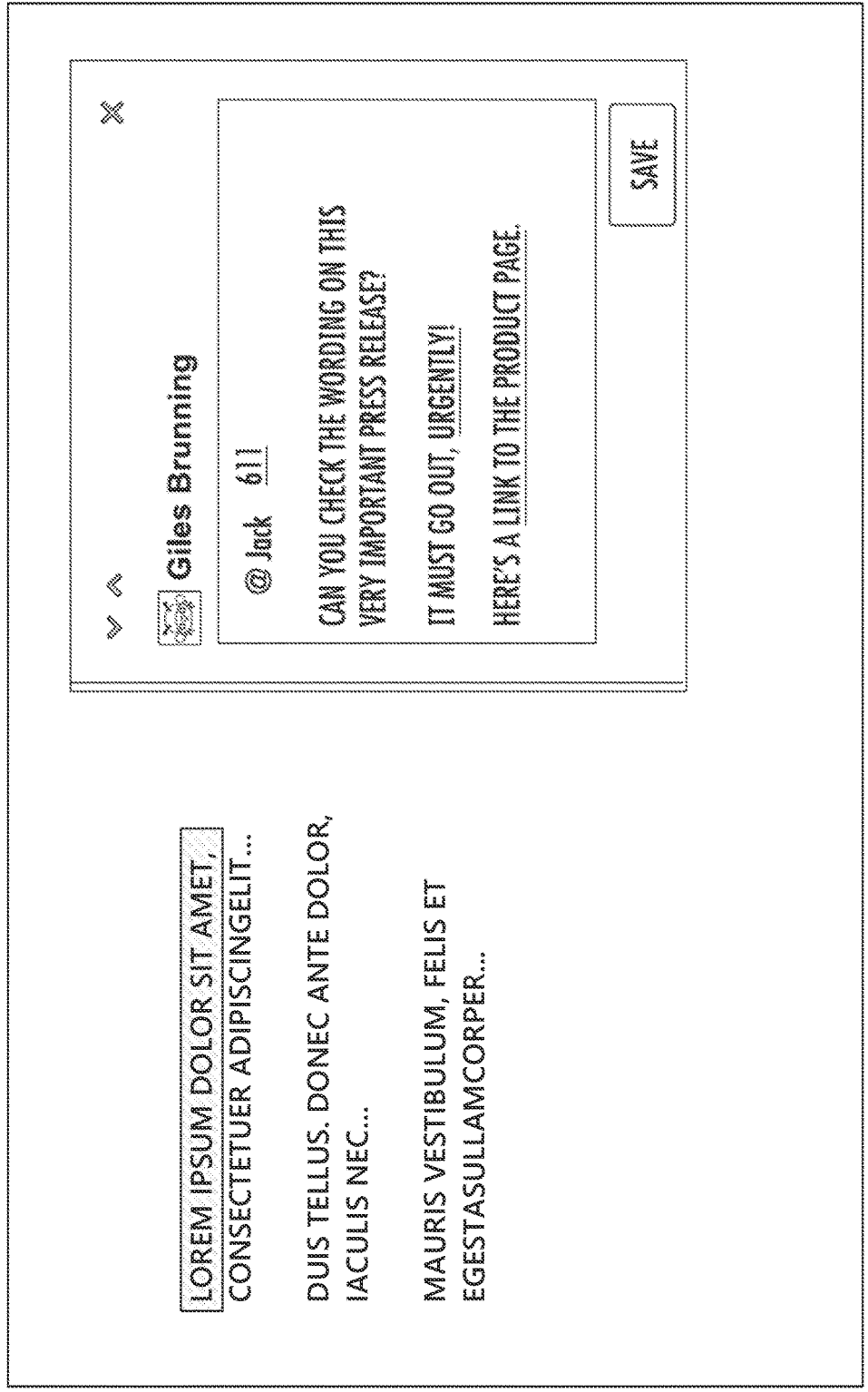

FIGS. 6A-6B provide operational examples of collaborative document user interface segments before and after entry of predefined cross-temporal referential inputs respectively in accordance with at least some embodiments of the present invention.

Figure 7:
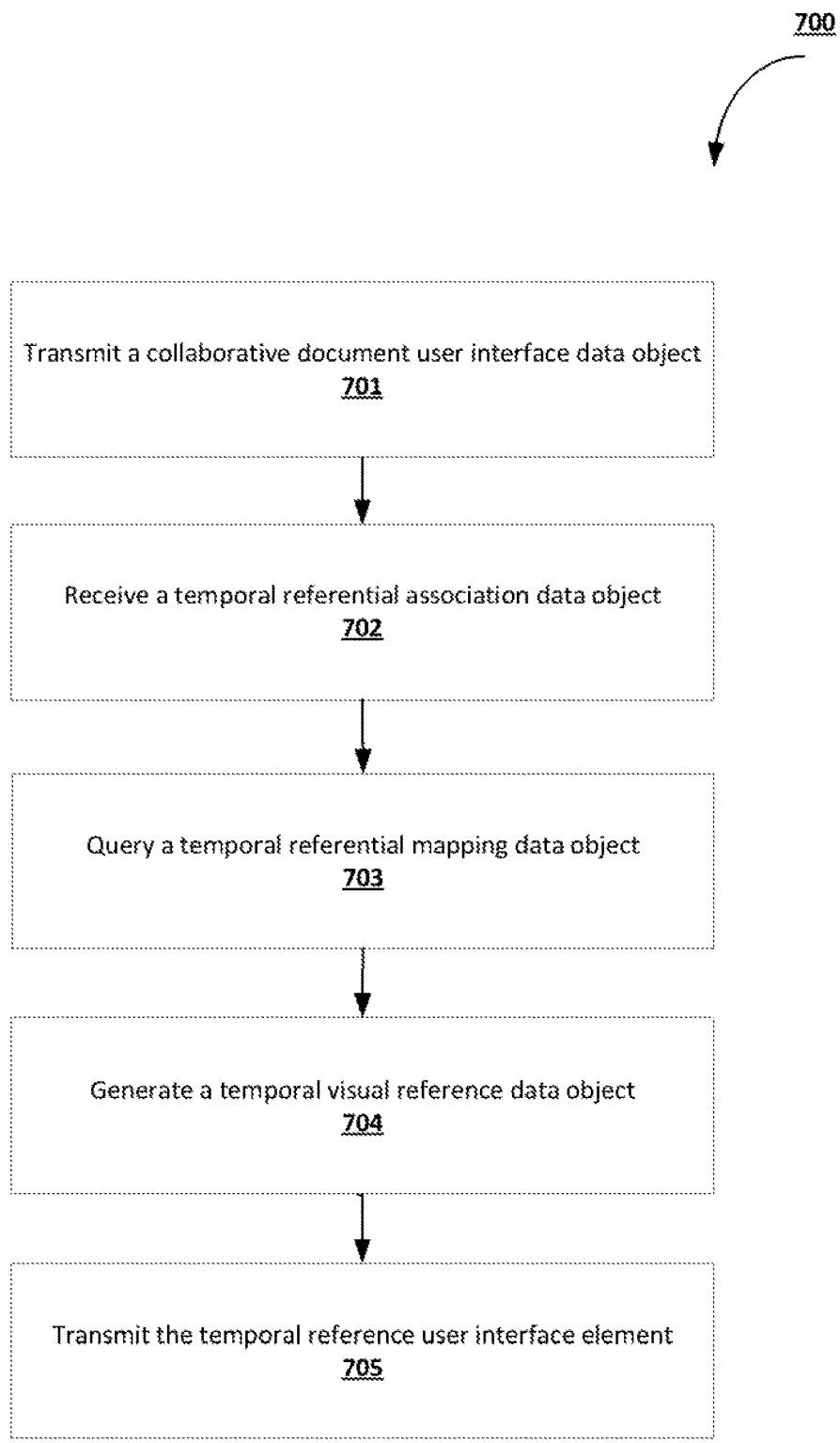

FIG. 7 is a flowchart diagram of an example process for performing server-side operations that are configured to enable temporal referential association in accordance with at least some embodiments of the present invention.

Figure 8:
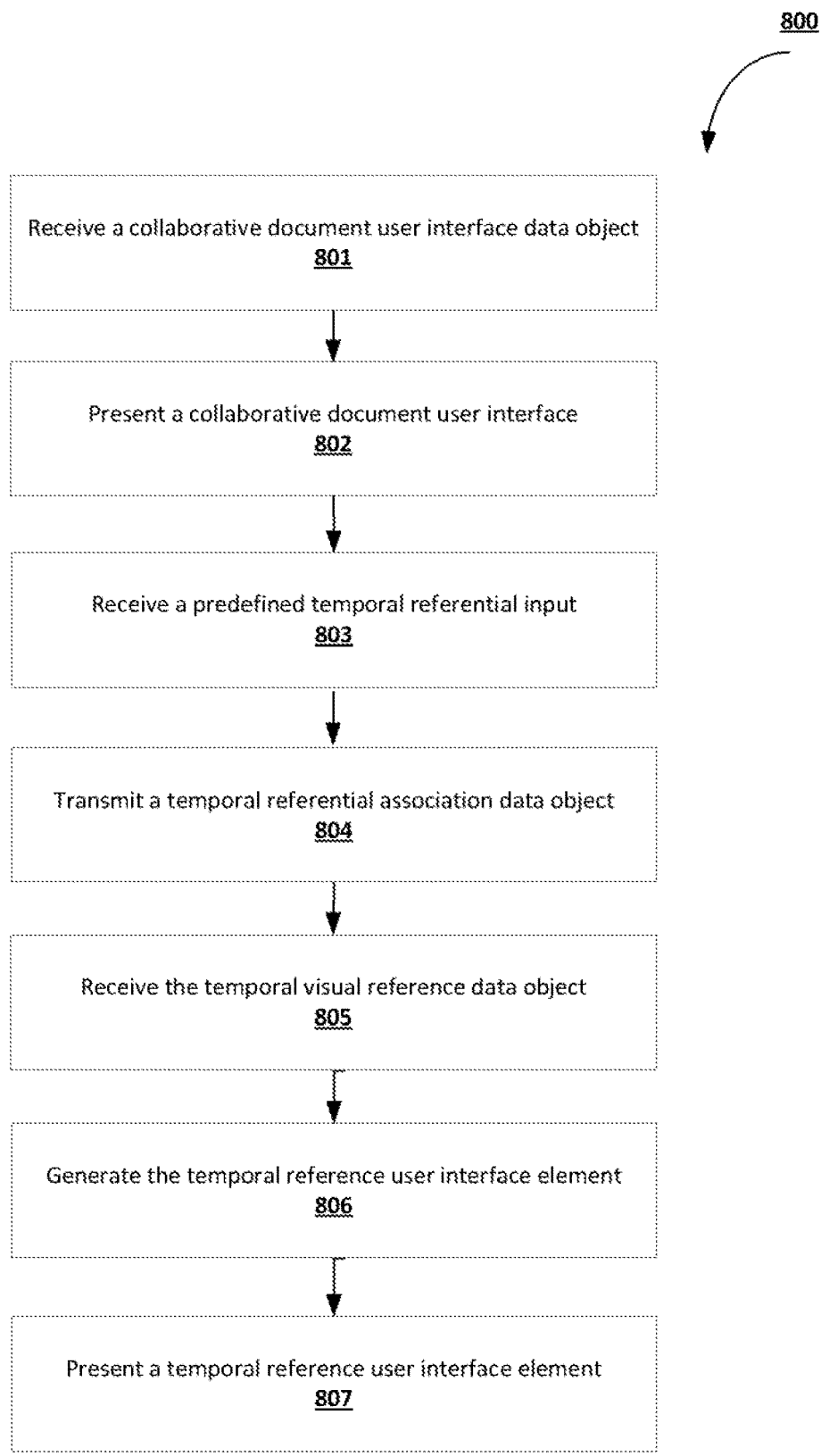

FIG. 8 is a flowchart diagram of an example process for performing client-side operations that are configured to enable temporal referential association in accordance with at least some embodiments of the present invention.

Figure 9A:
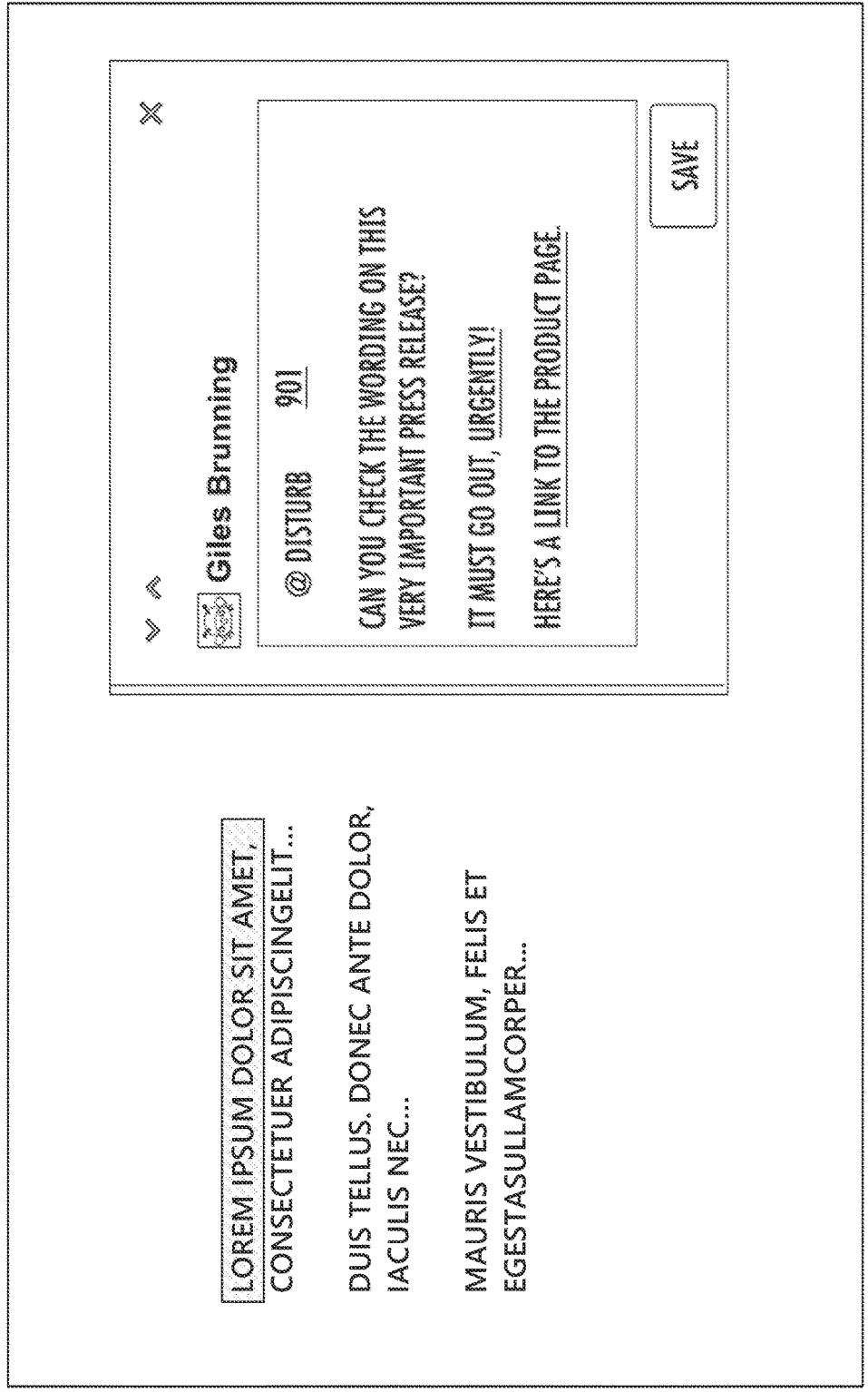
Figure 9B:
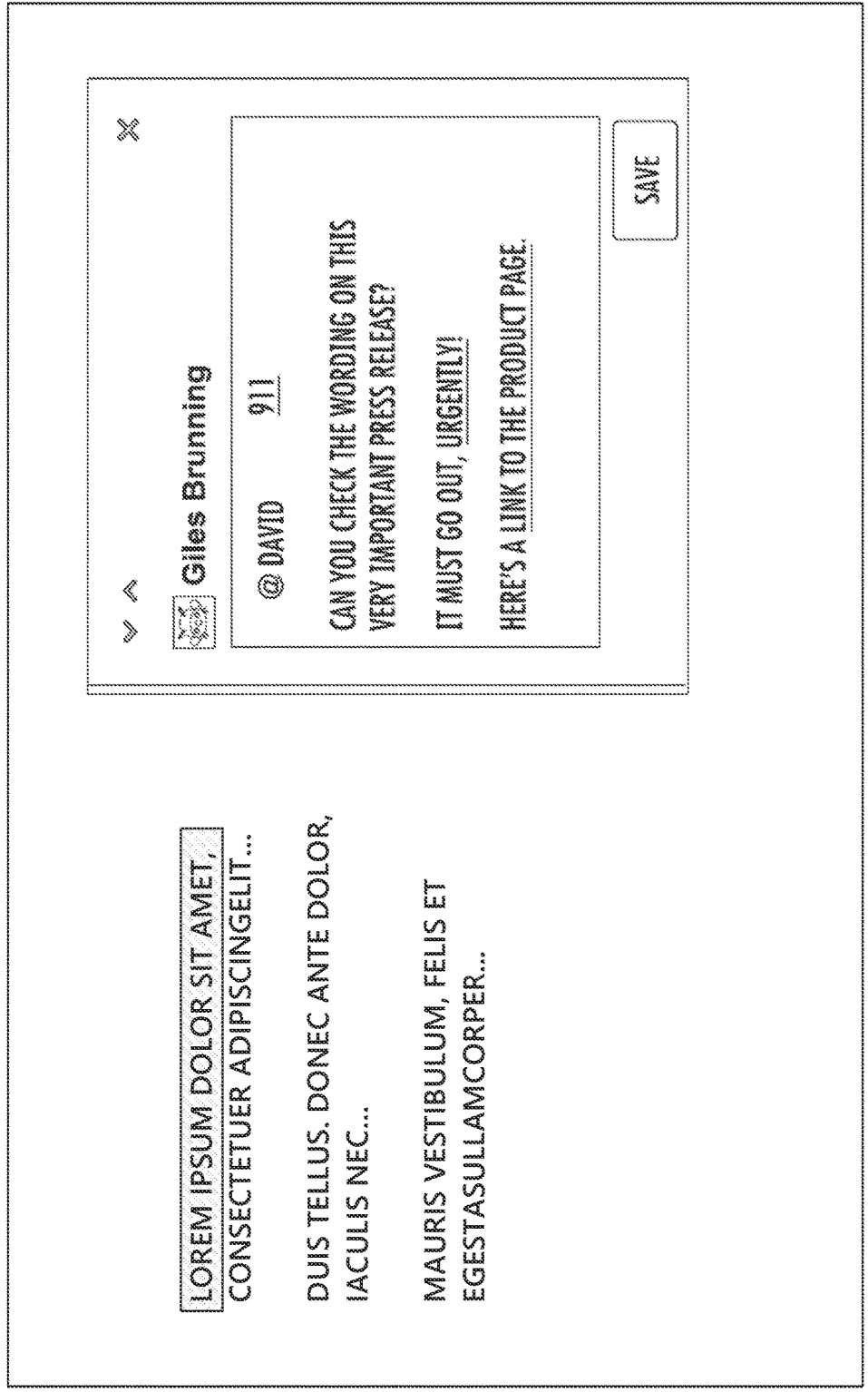

FIGS. 9A-9B provide operational examples of collaborative document user interface segments before and after entry of predefined temporal referential inputs respectively in accordance with at least some embodiments of the present invention.

Figure 10:
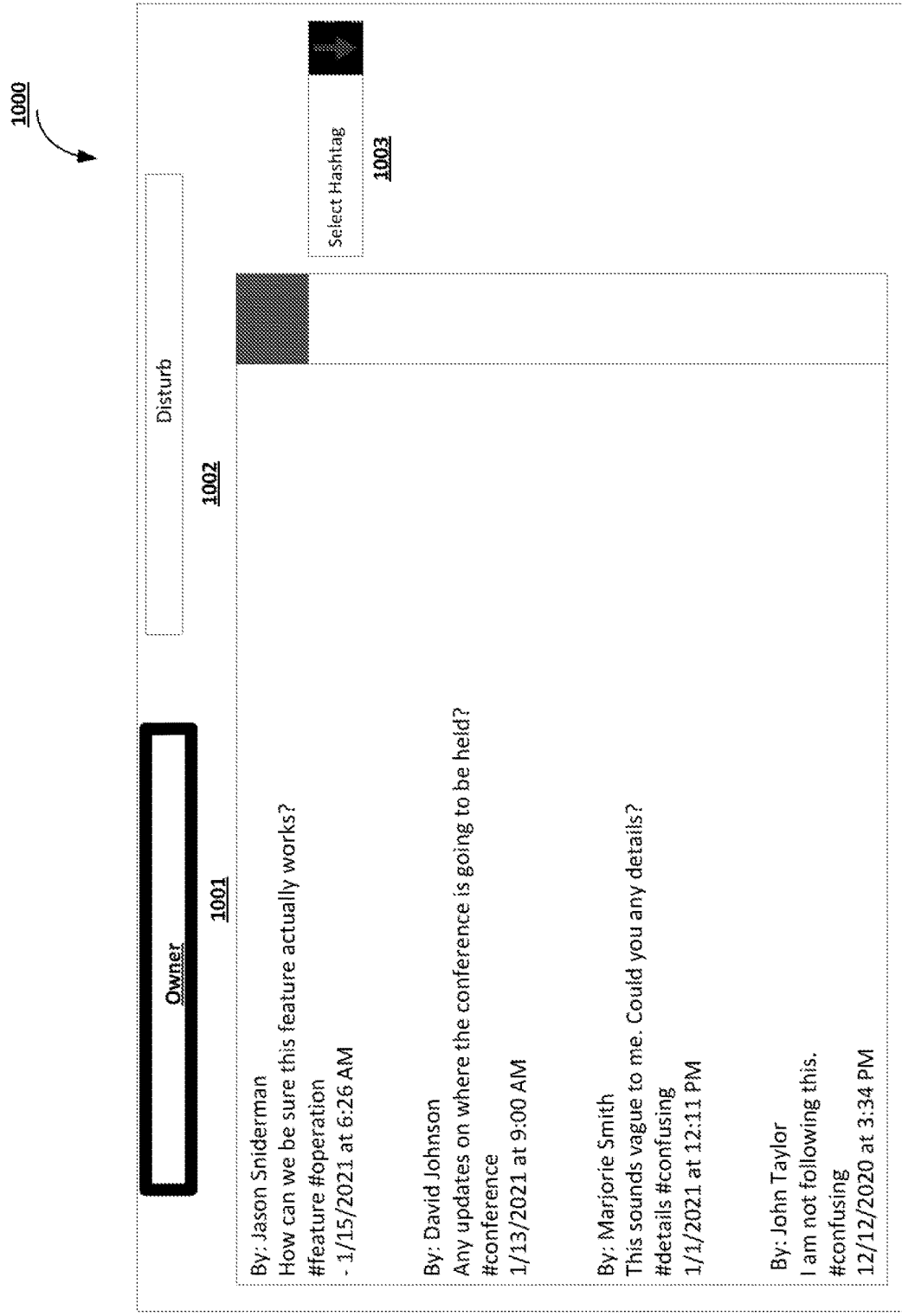

FIG. 10 provides an operational example of an administrator panel user interface in accordance with at least some embodiments of the present invention.

Figure 11:

FIG. 11 provides an operational example of a collaborative document user interface in accordance with at least some embodiments of the present invention.

FIG. 12 provides an operational example of a document metadata user interface in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein.

Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with efficiently and reliably enabling user interactions in a document collaboration server system. The disclosed techniques can be utilized by a document collaboration server system to enable user profiles of the noted document collaboration server systems to interact with each other while imposing less computational load on the document collaboration server systems compared to existing solutions for enabling user interactions in document collaboration server systems. An example of a document collaboration server system that may use the efficiency-enhancing techniques disclosed herein is the Confluence® collaborative document management platform that is owned by Atlassian PTY LTD.

Document collaboration server systems often store a large number of collaborative documents that are accessible/editable by a large number user profiles having different defined roles/responsibilities with respect to the collaborative documents. Moreover, each collaborative document may at each time be accessed by a group of user profiles that is larger than the group of user profiles that created the documents, and different portions of collaborative documents may be created by different user profiles. A consequence of this complexity is that a substantial number of processing operations need to be performed to enable user profiles to detect who to interact with in relation to a particular collaborative document. This may in some cases require opening new documents and/or retrieving document configuration data, both actions that when repeatedly performed impose a substantial computational load on a document collaboration server system.

For example, consider a collaborative document that is associated with an owner user profile, a legal support user profile, a human resources user profile, and a user profile that is configured to respond questions related to the collaborative document on a particular day of the week on which an end user profile seeks to ask such a question. Existing user interaction solutions that facilitate user interaction in document collaboration server systems require that the end user profile independently discover that, for example, @Jacob is the owner user profile for the collaborative document, @David is the legal support user profile for the collaborative document, @Jennifer is the human resources user profile for the collaborative document, and @Sam is the day-of-the-week question responder for the collaborative document. To do so, the end user profile may retrieve relevant data defining roles/responsibilities associated with the collaborative document, an action that imposes computational load on the document collaboration server system.

To address the above-noted challenges associated with user-initiated role/responsibility queries in complex document collaboration server systems, various embodiments of the present invention enable end-users to generate cross-temporal references and/or temporal references that are in turn in the backend associated with responsible document administrator user profiles via mapping data maintained by the document collaboration server systems. For example, in the example described in the preceding paragraph, the end user profile may be able to perform user interaction by providing the following references: owner, @legal, @HR, and @disturb, and the document collaboration server system may be configured to map the noted references to @Jacob, @David, @Jennifer, and @Sam respectively. In some embodiments, the document collaboration server system even modifies the visual representation of at least some of the @owner, @legal, @HR, and @disturb references to display @Jacob, @David, @Jennifer, and @Sam respectively.

By utilizing the above-described techniques, various embodiments of the present invention reduce or eliminate the need for end user awareness of particular roles/responsibilities related to a collaborative document. This in turn reduces the need for user-initiated role/responsibility queries in complex document collaboration server systems, a feature that reduces the computational load on the noted complex document collaboration server systems and improves the computational efficiency and the computational reliability of the complex document collaboration server systems.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a server. The server is often (but not always) on another computer system, in which case the client accesses the service by way of a network. Client computing devices may include, without limitation, smart phones, tablet computers, laptop computers, wearables, personal computers, enterprise computers, and the like.

The term "server computing device" refers to a combination of computer hardware and/or software that is configured to provide a service to a client device. An example of a server computing device is the document collaboration server computing device 106 of FIG. 1. In some embodiments, a server computing device communicates with one or more client computing devices using one or more computer networks.

The term "collaborative document user interface data object" refers to a collection of data items that is generated by a document collaboration server computing device and provided by the document collaboration server computing device to a client computing device. The collaborative document user interface data object describes user interface data associated with the collaborative document user interface and enables the client computing device to display the collaborative document user interface (e.g., by executing one or more instructions defined by the collaborative document user interface data object). In some embodiments, the collaborative document user interface data object describes markup data associated with a collaborative document user interface, such as Hypertext Markup Language (HTML) data associated with a collaborative document user interface.

The term "collaborative document user interface" refers to a user interface that is generated by a client computing device based on a collaborative document user interface data object that is provided to the client computing device by a document collaboration server computing device. The collaborative document user interface is configured to display content data associated with a corresponding collaborative document data object and enable an end user profile of the client computing device to make one or more modifications (e.g., modify contents of and/or add comments to) the corresponding collaborative document data object. For example, the collaborative document user interface may be a web-based user interface, such as a web-based user interface that is generated based on HTML, data associated with a collaborative document user interface data object.

The term "cross-temporal referential association data object" refers to a collection of data items that is generated by a client computing device and provided by the client computing device to a document collaboration server computing device. The cross-temporal referential association data object describes that an end user profile of the client computing device has provided a predefined cross-temporal referential input while interacting with a collaborative document user interface. For example, the cross-temporal referential association data object may be a data packet transmitted by a client computing device to a document collaboration server computing device that describes that an end user of the client computing device has, while interacting with a collaborative document user interface, entered an @owner reference as a comment to the collaborative document user interface. As another example, the cross-temporal referential association data object may be a data packet transmitted by a client computing device to a document collaboration server computing device that describes that an end user of the client computing has, while interacting with a collaborative document user interface, entered an @legal reference as a comment to the collaborative document user interface.

The term "predefined cross-temporal referential input" refers to a collection of data items that is provided by an end user profile of a client computing device to the client computing device. The predefined cross-temporal referential input is provided by the end user profile while interacting with a collaborative document user interface that is associated with a collaborative document data object. By providing the predefined cross-temporal referential input while interacting with collaborative document user interface, the end user profile is configured to describe that the end user profile seeks to reference a defined document administrator user profile associated with the collaborative document data object, where the association between the defined document administrator user profile and the collaborative document data object does not depend on a periodicity of a time associated with providing of the predefined cross-temporal referential input by the end user profile to the client computing device. An example of a predefined cross-temporal referential input is an "@owner" text input that may describe that an end user profile seeks to references a document administrator user profile that is deemed to be a cross-temporal owner of a collaborative document data object. Another example of a predefined cross-temporal referential input is an "@legal" text input that may describe that an end user profile seeks to references a document administrator user profile that is deemed to be a cross-temporal legal advisor of a project related to a collaborative document data object.

The term "predefined cross-temporal referential input type designation" refers to a collection of data items that may be inferred by either or both of a document collaboration server computing device or a client computing device based on a predefined cross-temporal referential input provided by an end user profile to a client computing device while interacting with a collaborative document user interface associated with a collaborative document data object. The predefined cross-temporal referential input type designation describes an inferred type of the predefined cross-temporal referential input, where mapping the predefined cross-temporal referential input a document administrator user profile associated with the collaborative document data object is performed based at least in part on the predefined cross-temporal referential input type designation. For example, in some embodiments, an @owner predefined cross-temporal referential input may have an owner predefined cross-temporal referential input type designation, a feature that causes mapping the @owner predefined cross-temporal referential input to an owner document administrator user profile of the corresponding collaborative document data object. As another example, in some embodiments, an @legal predefined cross-temporal referential input may have a legal advisor predefined cross-temporal referential input type designation, a feature that causes mapping the @legal predefined cross-temporal referential input to a legal advisor document administrator user profile of the corresponding collaborative document data object.

The term "cross-temporal referential mapping data object" refers to a collection of data items stored by a document collaboration server system that describes mappings between a group of predefined cross-temporal referential input type designations and a group of document administrator user profiles. Accordingly, the cross-temporal referential mapping data object describes a designated document administrator user profile for each predefined cross-temporal referential input type designation of the group of cross-temporal referential input type designations. For example, the cross-temporal referential mapping data object may describe that: (i) an owner predefined cross-temporal referential input type designation is associated with the document administrator user profile U1, (ii) a legal predefined cross-temporal referential input type designation is associated with the document administrator user profile U2, (iii) a human resources predefined cross-temporal referential input type designation is associated with the document administrator user profile U3, and (iv) an accounting predefined cross-temporal referential input type designation is associated with the document administrator user profile U4.

The term "cross-temporal visual reference data object" refers to a collection of data items that is generated by a document collaboration server system and provided by the document collaboration server computing device to a client computing device. The cross-temporal visual reference data object describes a designated document administrator user profile associated with a predefined cross-temporal referential input described by a cross-temporal referential association data object. The client computing device is configured to generate a cross-temporal reference user interface element based on the cross-temporal visual reference data object and present the cross-temporal reference user interface element to the end user profile as part of a collaborative document user interface. In some embodiments, the cross-temporal visual reference data object describes markup data (e.g., HTML data) associated with a corresponding cross-temporal reference user interface element.

The term "cross-temporal reference user interface element" refers to a user interface element that is generated by a client computing device based on a cross-temporal visual reference data object and provided by the client computing device to an end user profile of the client computing device. The cross-temporal reference user interface element may be a user interface element that describes/depicts at least an "@[user]" text, where the user value may be a string value that is determined based on a textual identifier of a designated document administrator user profile described by the cross-temporal visual reference data object.

The term "temporal referential association data object" refers to a collection of data items that is generated by a client computing device and provided by the client computing device to a document collaboration server computing device. The temporal referential association data object describes that an end user profile of the client computing device has provided a predefined temporal referential input while interacting with a collaborative document user interface. For example, the temporal referential association data object may be a data packet transmitted by a client computing device to a document collaboration server computing device that describes that an end user of the client computing has, while interacting with a collaborative document user interface, entered an @disturb reference as a comment to the collaborative document user interface.

The term "predefined temporal referential input" refers to a collection of data items that is provided by an end user profile of a client computing device to the client computing device. The predefined temporal referential input is provided by the end user profile while interacting with a collaborative document user interface that is associated with a collaborative document data object. By providing the predefined temporal referential input while interacting with collaborative document user interface, the end user profile is configured to describe that the end user profile seeks to reference a defined document administrator user profile associated with the collaborative document data object, where the association between the defined document administrator user profile and the collaborative document data object depends at least in part on a periodicity of a time associated with providing of the predefined cross-temporal referential input by the end user profile to the client computing device. An example of a predefined cross-temporal referential input is an "@disturb" text input that may describe that an end user profile seeks to references a document administrator user profile that is deemed to be responsible for a collaborative document data object for a particular day of a week.

The term "cyclical time period designation" refers to a collection of data items that is defined based on configuration data maintained by a predictive data analysis system. The cyclical time period designation describes a group of time periods that are defined by a common periodicity of the group of time periods. For example, the cyclical time period designation may describe a group of time periods that are all deemed to fall on a particular day of the week or on particular days of the week. As another example, the cyclical time period designation may describe a group of time periods that are all deemed to fall on a particular day of the month or on particular days of the month. As yet another example, the cyclical time period designation may describe a group of time periods that are all deemed to fall on a particular week of the month or on particular weeks of the month.

The term "temporal referential mapping data object" refers to a collection of data items stored by a document collaboration server system that describes mappings between a group of cyclical time period designations and a group of document administrator user profiles. Accordingly, the temporal referential mapping data object describes a designated document administrator user profile for each cyclical time period designation of a group of cyclical time period designations. For example, the temporal referential mapping data object may describe that: (i) @disturb references provided on Mondays are associated with the document administrator user profile U1, (ii) @disturb references provided on Mondays and Tuesdays are associated with the document administrator user profile U2, (iii) @disturb references provided on Wednesdays and Thursdays are associated with the document administrator user profile U3, and (iv) @disturb references provided on other days of the week are associated with the document administrator user profile U4.

The term "temporal visual reference data object" refers to a collection of data items that is generated by a document collaboration server system and provided by the document collaboration server computing device to a client computing device. The temporal visual reference data object describes a designated document administrator user profile associated with a predefined temporal referential input described by a temporal referential association data object. The client computing device is configured to generate a temporal reference user interface element based on the temporal visual reference data object and present the temporal reference user interface element to the end user profile as part of a collaborative document user interface. In some embodiments, the temporal visual reference data object describes markup data (e.g., HTML data) associated with a corresponding temporal reference user interface element.

The term "temporal reference user interface element" refers to a user interface element that is generated by a client computing device based on a temporal visual reference data object and provided by the client computing device to an end user profile of the client computing device. The temporal reference user interface element may be a user interface element that describes/depicts at least an "@[user]" text, where the user value may be a string value that is determined based on a textual identifier of a designated document administrator user profile described by the temporal visual reference data object.

The term "administrator panel user interface presentation request" refers to a collection of data items that is generated by a client computing device and provided by the client computing device to a document collaboration server computing device. The administrator panel user interface presentation request describes a request by an end user of the client computing device to access an administrator panel user interface associated with a document administrator user profile. The administrator panel user interface presentation request may describe an identifier for the document administrator user profile whose administrator panel user interface the end user seeks to access. The administrator panel user interface presentation request may further describe authentication data associated with the document administrator user profile, where the authentication data is used to determine that the end user profile is privileged to access the document collaboration user interface.

The term "administrator panel user interface data object" refers to a collection of data items that is generated by a document collaboration server computing device and provided by the document collaboration server computing device to a client computing device. The administrator panel user interface data object describes user interface data associated with an administrator panel user interface and enables the client computing device to display the administrator panel user interface (e.g., by executing one or more instructions defined by the administrator panel user interface data object). In some embodiments, the administrator panel user interface data object describes markup data associated with an administrator panel user interface, such as Hypertext Markup Language (HTML) data associated with an administrator panel user interface.

The term "administrator panel user interface" refers to a user interface that is generated by a client computing device based on an administrator panel user interface data object that is provided to the client computing device by a document collaboration server computing device. The administrator panel user interface is configured to display administrator data associated with a corresponding collaborative document data object and enable an end user profile of the client computing device to make one or more modifications to the corresponding administrator data. For example, the collaborative document user interface may be a web-based user interface, such as a web-based user interface that is generated based on HTML data associated with an administrator panel user interface data object. In some embodiments, an administrator panel user interface describes one or more cross-temporal document references for the corresponding document administrator user profile using a cross-temporal reference tab of the administrator panel user interface. In some embodiments, an administrator panel user interface describes one or more temporal document references for the corresponding document administrator user profile using a temporal reference tab of the administrator panel user interface.

The term "collaborative document data object" refers to a collection of data items that is generated by a document collaboration server computing device and transmitted by the document collaboration server computing device to the client computing device as part of a collaborative document graph-based interface object. The collaborative document data object describes one or more document property data fields associated with a corresponding collaborative document stored in a storage subsystem of a document collaboration server system that is associated with a document collaboration server computing device. For example, the collaborative document data object may describe an identifier of the corresponding collaborative document, a revision history of the corresponding collaborative document, a location of the corresponding collaborative document, a size of the corresponding collaborative document, and/or the like. The client computing device is configured to process the collaborative document data object to generate a collaborative document node element for the corresponding collaborative document in a collaborative document graph-based interface, where the collaborative document node element depicts a visual representation of a collaborative document associated with the corresponding collaborative document data object, as well as optionally the one or more document property data fields described by the corresponding collaborative document data object.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
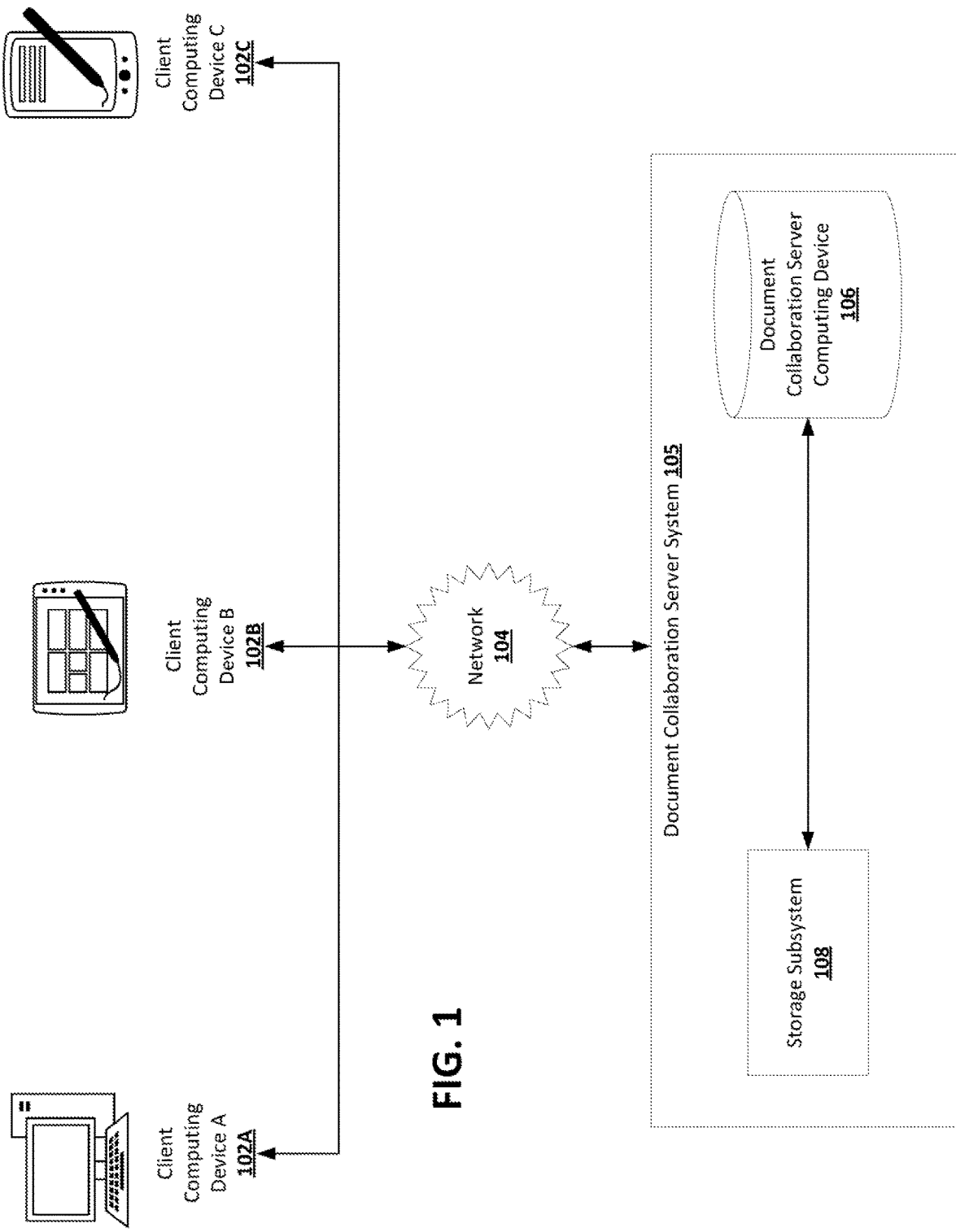
FIG. 1 is a block diagram of an example architecture within which at least some embodiments of the present invention may operate.

FIG. 1 depicts an exemplary architecture 100 for enabling referential association in a document collaboration server system. The architecture 100 includes a group of client computing devices 102A-C and a document collaboration server system 105. The document collaboration server system 105 is configured to store collaborative documents in a storage subsystem 108 and provide the collaborative documents in response to user queries transmitted by the client computing devices 102A-C. The storage subsystem 108 is configured to store document content data as well as document metadata. The document collaboration server computing device 106 is configured to receive user queries from client computing devices 102A-C and provide document contents in response to the received user queries to the client computing devices.

The client computing devices 102A-C and the document collaboration server computing device 106 may communicate over one or more networks (e.g., network 104). A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Websocket channel. In some embodiments, the protocol is JSON over RPC, JSON over REST/HTTP, and the like.

Exemplary Document Collaboration Server Computing Device

Figure 2:
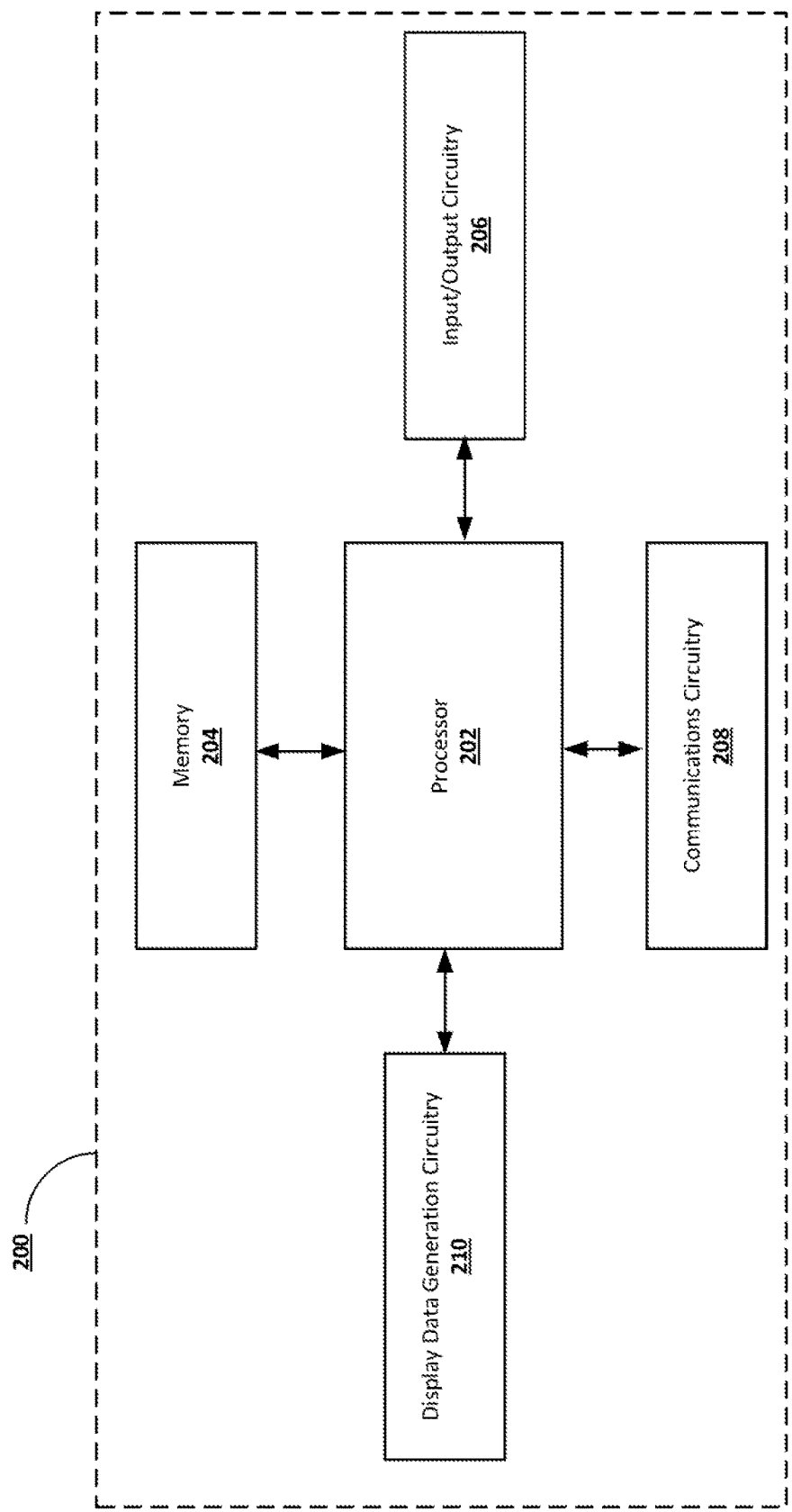
FIG. 2 is a block diagram of an example document collaboration server computing device in accordance with at least some embodiments of the present invention.

The document collaboration server computing device 106 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
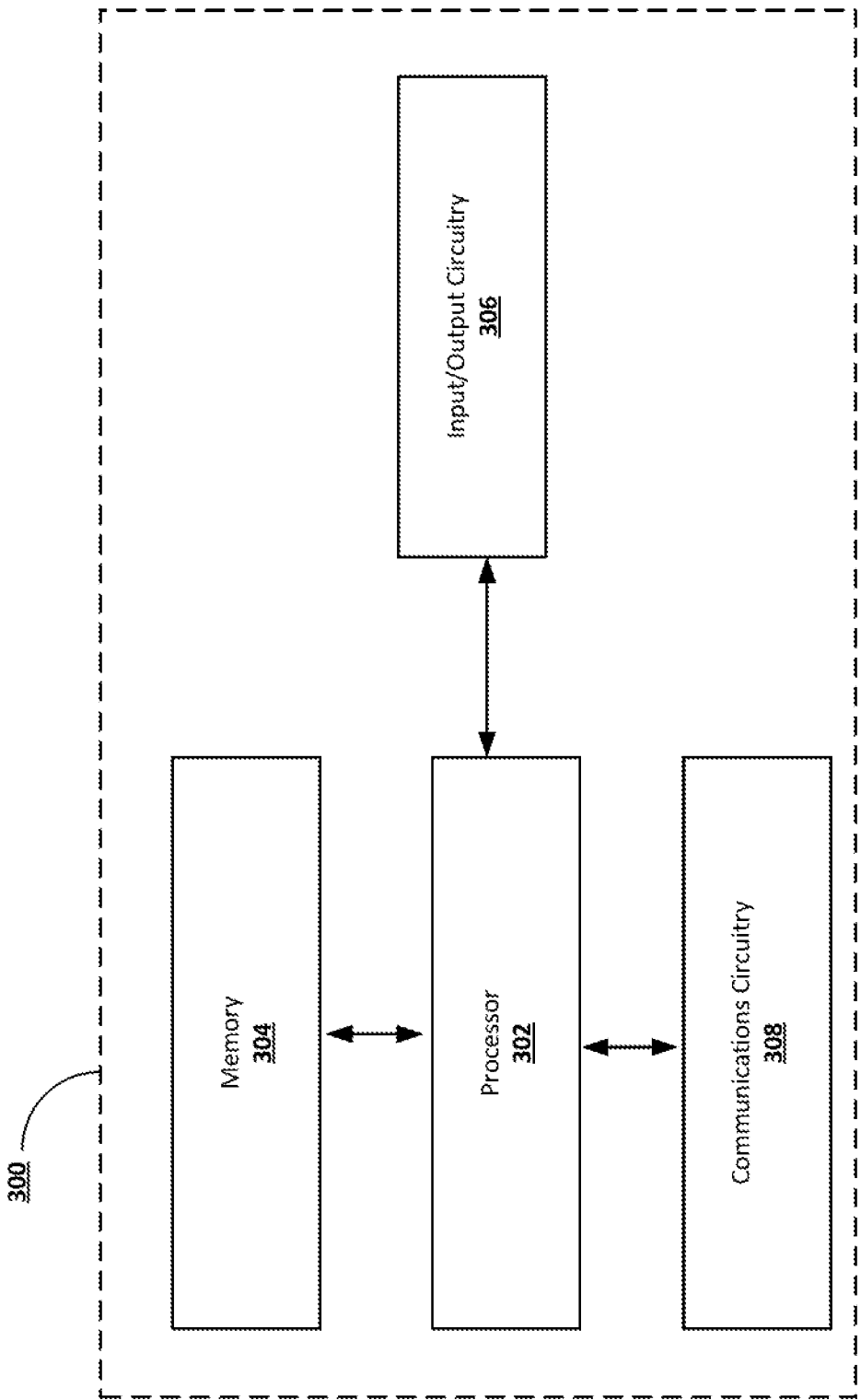
FIG. 3 is a block diagram of an example client computing device in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

Provided below are techniques for performing temporally dynamic referential association in document collaboration server systems. However, a person of ordinary skill in the relevant technology will recognize that the disclosed techniques can be used to perform temporally dynamic referential association in various types of non-collaborative document management systems. Moreover, while various embodiments of the present invention disclose performing cross-temporal referential association and temporal referential association using client-server architectures, a person of ordinary skill in the relevant technology will recognize that: (i) in some embodiments, all of the operations related to performing cross-temporal referential association may be performed by one computing device (e.g., a client computing device); and/or (ii) in some embodiments, all of the operations related to performing temporal referential association may be performed by one computing device (e.g., a client computing device).

Exemplary Server-Side Operations for
Cross-Temporal Referential Association

Figure 4:
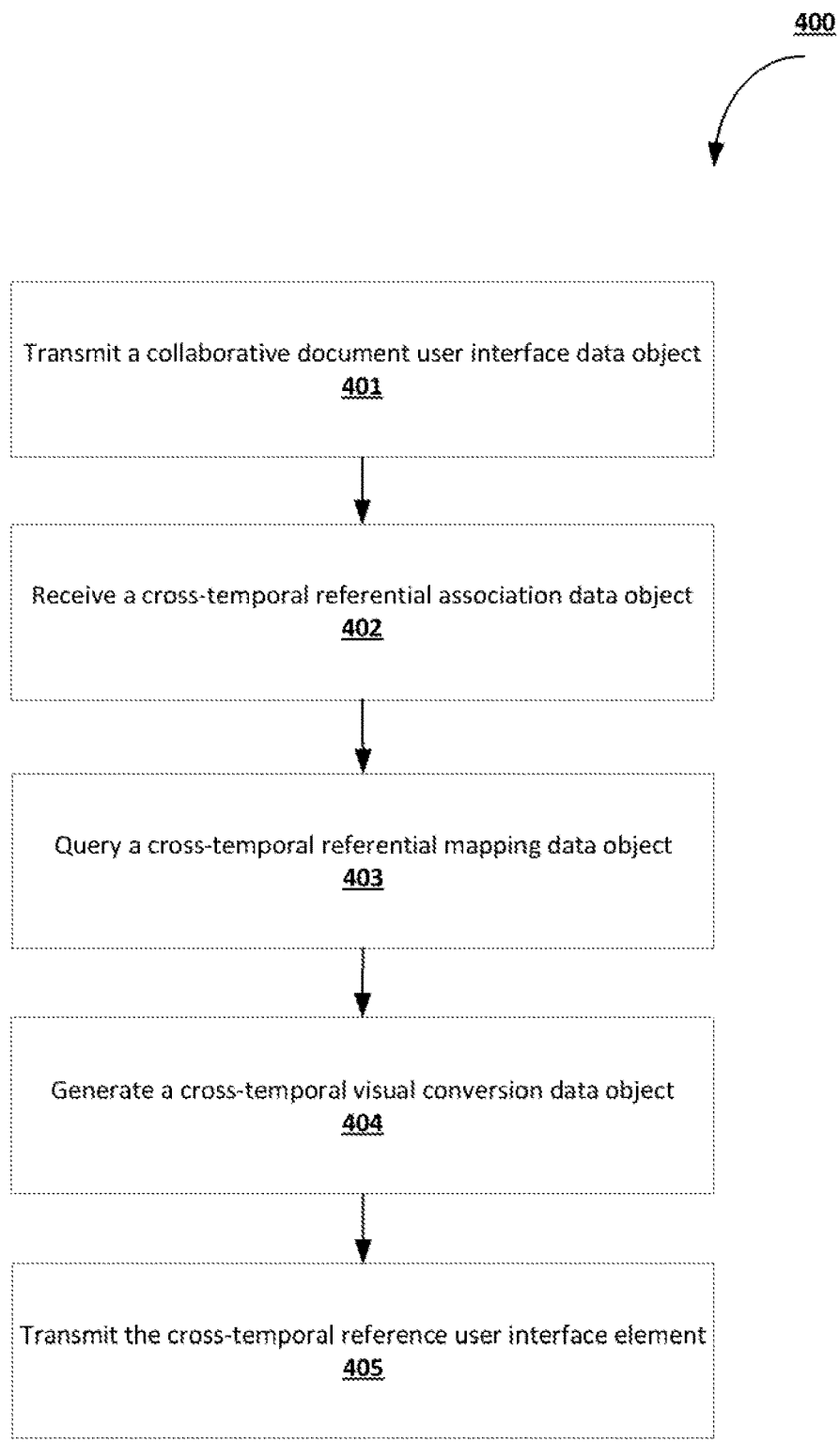
FIG. 4 is a flowchart diagram of an example process for performing server-side operations that are configured to enable cross-temporal referential association in accordance with at least some embodiments of the present invention.

FIG. 4 is a flowchart diagram of an example process 400 for performing server-side operations needed to enable cross-temporal referential association between a collaborative document data object and a group of document administrator user profiles associated with the collaborative document data object. Via the various steps/operations of the process 400, the document collaboration server computing device 106 can enable an end user profile of a client computing device 102A-C to generate cross-temporal references while interacting with collaborative document user interfaces without the need to query associations between document administrator user profiles and collaborative document data objects, an approach that improves the computational load on document collaboration server systems 105 by reducing the number of end-user-initiated queries to the noted document collaboration server systems 105.

The process 400 begins at operation 401 when the document collaboration server computing device 106 transmits a collaborative document user interface data object associated with a collaborative document user interface for the collaborative document data object to a client computing device 102A-C. In some embodiments, the client computing device 102A-C is configured to generate the collaborative document user interface based on the collaborative document user interface data object and present the collaborative document user interface to an end user profile of the client computing device 102A-C.

In general, the collaborative document user interface data object may describe user interface data associated with the collaborative document user interface and enables the client computing device to display the collaborative document user interface (e.g., by executing one or more instructions defined by the collaborative document user interface data object). In some embodiments, the collaborative document user interface data object describes markup data associated with a collaborative document user interface, such as Hypertext Markup Language (HTML) data associated with a collaborative document user interface. Moreover, the collaborative document user interface may describe a user interface that is configured to display content data associated with a corresponding collaborative document data object and enable an end user profile of the client computing device to make one or more modifications (e.g., modify contents of and/or add comments to) the corresponding collaborative document data object. For example, the collaborative document user interface may be a web-based user interface, such as a web-based user interface that is generated based on HTML data associated with a collaborative document user interface data object.

An operational example of a user interface segment 600 of a collaborative document user interface is depicted in FIGS. 6A-6B. As depicted in FIGS. 6A-6B, the user interface segment 600 depicts a portion of the contents of a corresponding collaborative document data object, along with a comment to the corresponding collaborative document data object.

At operation 402, the document collaboration server computing device 106 receives, from the client computing device 102A-C, a cross-temporal referential association data object. The cross-temporal referential association data object may describe that an end user profile of the client computing device 102A-C has provided a predefined cross-temporal referential input while interacting with a collaborative document user interface. For example, the cross-temporal referential association data object may be a data packet transmitted by a client computing device to a document collaboration server computing device that describes that an end user of the client computing has, while interacting with a collaborative document user interface, entered an @owner reference as a comment to the collaborative document user interface. As another example, the cross-temporal referential association data object may be a data packet transmitted by a client computing device to a document collaboration server computing device that describes that an end user of the client computing has, while interacting with a collaborative document user interface, entered an @legal reference as a comment to the collaborative document user interface.

In some embodiments, the cross-temporal referential association data object is generated by the client computing device 102A-C based on a predefined cross-temporal referential input provided by the end user profile during an interaction of the end user profile with the collaborative document user interface. The predefined cross-temporal referential input may be provided by the end user profile while interacting with a collaborative document user interface that is associated with a collaborative document data object. By providing the predefined cross-temporal referential input while interacting with collaborative document user interface, the end user profile may be configured to describe that the end user profile seeks to reference a defined document administrator user profile associated with the collaborative document data object, where the association between the defined document administrator user profile and the collaborative document data object does not depend on a periodicity of a time associated with providing of the predefined cross-temporal referential input by the end user profile to the client computing device. An example of a predefined cross-temporal referential input is an "@owner" text input that may describe that an end user profile seeks to references a document administrator user profile that is deemed to be a cross-temporal owner of a collaborative document data object. Another example of a predefined cross-temporal referential input is an "@legal" text input that may describe that an end user profile seeks to references a document administrator user profile that is deemed to be a cross-temporal legal advisor of a project related to a collaborative document data object.

In some embodiments, the predefined cross-temporal referential input is associated with a first predefined cross-temporal referential input type designation of one or more predefined cross-temporal referential input type designations. The predefined cross-temporal referential input type designation may describe an inferred type of the predefined cross-temporal referential input, where mapping the predefined cross-temporal referential input a document administrator user profile associated with the collaborative document data object is performed based at least in part on the predefined cross-temporal referential input type designation. For example, in some embodiments, an @owner predefined cross-temporal referential input may have an owner predefined cross-temporal referential input type designation, a feature that causes mapping the @owner predefined cross-temporal referential input to an owner document administrator user profile of the corresponding collaborative document data object. As another example, in some embodiments, an @legal predefined cross-temporal referential input may have a legal advisor predefined cross-temporal referential input type designation, a feature that causes mapping the @legal predefined cross-temporal referential input to a legal advisor document administrator user profile of the corresponding collaborative document data object. In some embodiments, the one or more predefined cross-temporal referential input type designations comprise one or more label-based predefined cross-temporal referential input type designations, and each label-based predefined cross-temporal referential input type designation of the one or more label-based predefined cross-temporal referential input type designations is associated with a reference label of one or more reference labels. In some embodiments, the one or more predefined cross-temporal referential input type designations comprise an owner-referenced predefined cross-temporal referential input type designation.

An operational example of a predefined cross-temporal referential input 601 is depicted in the user interface segment 600 of FIG. 6A. As depicted in FIG. 6A, the predefined cross-temporal referential input 601 includes the text "@owner". It should be noted that, in at least some embodiments, the text "@owner" is depicted as "@owner" before the user submits the text through a predefined action (e.g., through an enter keystroke, through a space keystroke, and/or the like), as submission of the text causes the text to be converted to an "@[user]" text, where user is the designated document administrator user profile for the cross-temporal referential association data object as determined based on a predefined cross-temporal referential input type designation of the predefined cross-temporal referential input described by the cross-temporal referential association data object.

At operation 403, the document collaboration server computing device 106 queries a cross-temporal referential mapping data object associated with the collaborative document data object to identify a designated cross-temporal document administrator user profile of the group of document administrator user profiles for the first predefined cross-temporal referential input type designation. In some embodiments, the cross-temporal referential mapping data object associates each predefined cross-temporal referential input type designation of the one or more predefined cross-temporal referential input type designations to a corresponding document administrator user profile of the group of document administrator user profiles. The cross-temporal referential mapping data object may describe mappings between a group of predefined cross-temporal referential input type designations and a group of document administrator user profiles. Accordingly, the cross-temporal referential mapping data object may describe a designated document administrator user profile for each predefined cross-temporal referential input type designation of the group of cross-temporal referential input type designations. For example, the cross-temporal referential mapping data object may describe that: (i) an owner predefined cross-temporal referential input type designation is associated with the document administrator user profile U1, (ii) a legal predefined cross-temporal referential input type designation is associated with the document administrator user profile U2, (iii) a human resources predefined cross-temporal referential input type designation is associated with the document administrator user profile U3, and (iv) an accounting predefined cross-temporal referential input type designation is associated with the document administrator user profile U4.

At operation 404, the document collaboration server computing device 106 generates a cross-temporal visual conversion data object based on the designated cross-temporal document administrator user profile. The cross-temporal visual reference data object may describe a designated document administrator user profile associated with a predefined cross-temporal referential input described by a cross-temporal referential association data object. The client computing device 102A-C may be configured to generate a cross-temporal reference user interface element based on the cross-temporal visual reference data object and present the cross-temporal reference user interface element to the end user profile as part of a collaborative document user interface. In some embodiments, the cross-temporal visual reference data object describes markup data (e.g., HTML data) associated with a corresponding cross-temporal reference user interface element.

At operation 405, the document collaboration server computing device 106 transmits the cross-temporal visual conversion data object to the client computing device 102A-C. As described above, the client computing device 102A-C may be configured to generate a cross-temporal reference user interface element based on the cross-temporal visual reference data object and present the cross-temporal reference user interface element to the end user profile as part of a collaborative document user interface. The cross-temporal reference user interface element may be a user interface element that describes/depicts at least an "@[user]" text, where the user value may be a string value that is determined based on a textual identifier of a designated document administrator user profile described by the cross-temporal visual reference data object. An operational example of a cross-temporal reference user interface element is the "@Jack" text 611 depicted in the user interface segment 600 of FIG. 6B.

In some embodiments, the document collaboration server computing device 106 is configured to receive a temporal referential mapping modification request, wherein the temporal referential mapping modification request defines a new designated cross-temporal document administrator user profile of the group of administrator user profiles for the collaborative document data object; and modify the temporal referential mapping data object based on the temporal referential mapping modification request. In some embodiments, subsequent to modifying the temporal referential mapping data object based on the temporal referential mapping modification request, the document collaboration server computing device 106 is configured to: receive, from the client computing device, a second cross-temporal referential association data object, wherein the second cross-temporal referential association data object is generated by the client computing device based on the predefined cross-temporal referential input provided by a second end user profile during an interaction of the second end user profile with the collaborative document user interface; query the cross-temporal referential mapping data object associated with the collaborative document data object to identify the new designated cross-temporal document administrator user profile for the first predefined cross-temporal referential input type designation; and transmit a second cross-temporal visual conversion data object describing the new designated cross-temporal document administrator user profile to the client computing device, wherein the client computing device is configured to generate a second cross-temporal reference user interface element based on the second cross-temporal visual conversion data object and present the second cross-temporal reference user interface element to the second end user profile as part of the collaborative document user interface.

Exemplary Client-Side Operations for
Cross-Temporal Referential Association

Figure 5:
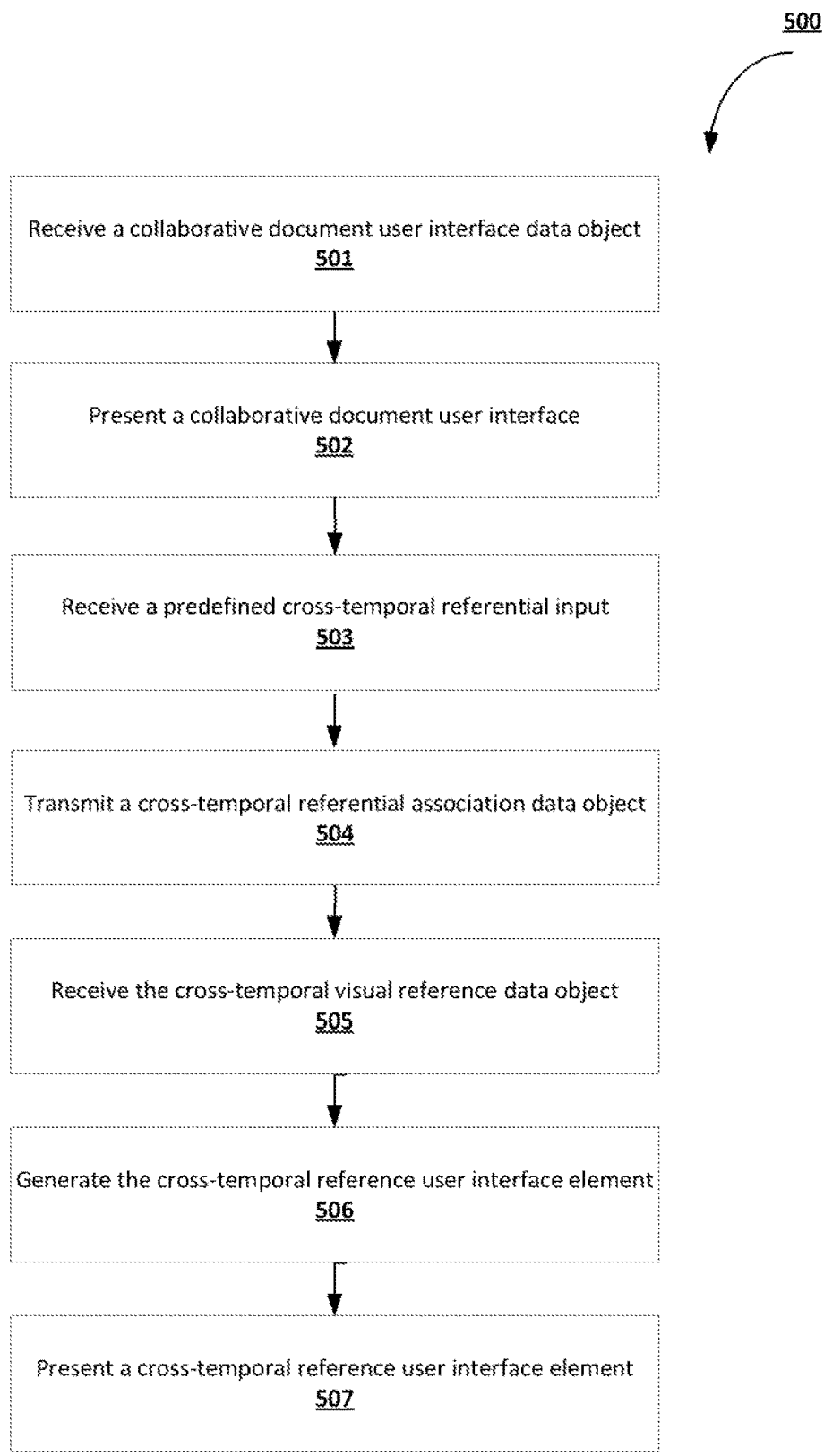
FIG. 5 is a flowchart diagram of an example process for performing client-side operations that are configured to enable cross-temporal referential association in accordance with at least some embodiments of the present invention.

FIG. 5 is a flowchart diagram of an example process 500 for performing client-side operations needed to enable cross-temporal referential association between a collaborative document data object and a group of document administrator user profiles associated with the collaborative document data object. Via the various steps/operations of the process 500, a client computing device 102A-C can interact with a document collaboration server computing device 106 in a manner that causes the document collaboration server computing device 106 to enable an end user profile of a client computing device 102A-C to generate cross-temporal references while interacting with collaborative document user interfaces without the need to query associations between document administrator user profiles and collaborative document data objects, an approach that improves the computational load on document collaboration server systems 105 by reducing the number of end-user-initiated queries to the noted document collaboration server systems 105.

The process 500 begins at operation 501 when the client computing device 102A-C receives a collaborative document user interface data object from the document collaboration server computing device 106. In some embodiments, the client computing device 102A-C is configured to generate the collaborative document user interface based on the collaborative document user interface data object and present the collaborative document user interface to an end user profile of the client computing device 102A-C. The collaborative document user interface data object may describe user interface data associated with the collaborative document user interface and enables the client computing device to display the collaborative document user interface (e.g., by executing one or more instructions defined by the collaborative document user interface data object). In some embodiments, the collaborative document user interface data object describes markup data associated with a collaborative document user interface, such as Hypertext Markup Language (HTML) data associated with a collaborative document user interface.

At operation 502, the client computing device 102A-C generates and presents a collaborative document user interface to an end user profile of the client computing device 102A-C based on the collaborative document user interface data object. The collaborative document user interface may describe a user interface that is configured to display content data associated with a corresponding collaborative document data object and enable an end user profile of the client computing device to make one or more modifications (e.g., modify contents of and/or add comments to) the corresponding collaborative document data object. For example, the collaborative document user interface may be a web-based user interface, such as a web-based user interface that is generated based on HTML, data associated with a collaborative document user interface data object.

At operation 503, the client computing device 102A-C receives a predefined cross-temporal referential input from an end user profile of the client computing device 102A-C. The predefined cross-temporal referential input may be provided by the end user profile while interacting with a collaborative document user interface that is associated with a collaborative document data object. By providing the predefined cross-temporal referential input while interacting with collaborative document user interface, the end user profile may be configured to describe that the end user profile seeks to reference a defined document administrator user profile associated with the collaborative document data object, where the association between the defined document administrator user profile and the collaborative document data object does not depend on a periodicity of a time associated with providing of the predefined cross-temporal referential input by the end user profile to the client computing device. An example of a predefined cross-temporal referential input is an "@owner" text input that may describe that an end user profile seeks to references a document administrator user profile that is deemed to be a cross-temporal owner of a collaborative document data object. Another example of a predefined cross-temporal referential input is an "@legal" text input that may describe that an end user profile seeks to references a document administrator user profile that is deemed to be a cross-temporal legal advisor of a project related to a collaborative document data object.

At operation 504, the client computing device 102A-C generates (e.g., based on the predefined cross-temporal referential input and/or based on the predefined cross-temporal referential input type designation of the predefined cross-temporal referential input) a cross-temporal referential association data object and transmits the cross-temporal referential association data object to a document collaboration server computing device 106. The cross-temporal referential association data object may describe that an end user profile of the client computing device 102A-C has provided a predefined cross-temporal referential input while interacting with a collaborative document user interface. For example, the cross-temporal referential association data object may be a data packet transmitted by a client computing device to a document collaboration server computing device that describes that an end user of the client computing has, while interacting with a collaborative document user interface, entered an @owner reference as a comment to the collaborative document user interface. As another example, the cross-temporal referential association data object may be a data packet transmitted by a client computing device to a document collaboration server computing device that describes that an end user of the client computing has, while interacting with a collaborative document user interface, entered an @legal reference as a comment to the collaborative document user interface.

In some embodiments, the cross-temporal referential association data object is generated by the client computing device 102A-C based on a predefined cross-temporal referential input provided by the end user profile during an interaction of the end user profile with the collaborative document user interface. In some embodiments, the predefined cross-temporal referential input is associated with a first predefined cross-temporal referential input type designation of one or more predefined cross-temporal referential input type designations. In some embodiments, the cross-temporal referential association data object is generated by the client computing device 102A-C to describe a predefined cross-temporal referential input provided by the end user profile during an interaction of the end user profile with the collaborative document user interface and/or a predefined cross-temporal referential input type designation of one or more predefined cross-temporal referential input type designations for the noted predefined cross-temporal referential input.

At operation 505, the client computing device 102A-C receives a cross-temporal visual reference data object from the document collaboration server computing device 106. The cross-temporal visual reference data object may describe a designated document administrator user profile associated with a predefined cross-temporal referential input described by a cross-temporal referential association data object. The client computing device 102A-C may be configured to generate a cross-temporal reference user interface element based on the cross-temporal visual reference data object and present the cross-temporal reference user interface element to the end user profile as part of a collaborative document user interface. In some embodiments, the cross-temporal visual reference data object describes markup data (e.g., HTML data) associated with a corresponding cross-temporal reference user interface element.

At operation 506, the client computing device 102A-C generates a cross-temporal reference user interface element based on the cross-temporal visual reference data object. The cross-temporal reference user interface element may be a user interface element that describes/depicts at least an "@[user]" text, where the user value may be a string value that is determined based on a textual identifier of a designated document administrator user profile described by the cross-temporal visual reference data object. An operational example of a cross-temporal reference user interface element is the "@Jack" text 611 depicted in the user interface segment 600 of FIG. 6B.

At operation 507, the client computing device 102A-C presents the cross-temporal reference user interface element to an end user profile of the client computing device 102A-C. In some embodiments, the client computing device 102A-C updates the collaborative document user interface to display the cross-temporal reference user interface element in a segment of the collaborative document user interface that corresponds to the predefined cross-temporal referential input.

Exemplary Server-Side Operations for Temporal Referential Association

FIG. 7 is a flowchart diagram of an example process 700 for performing server-side operations needed to enable temporal referential association between a collaborative document data object and a group of document administrator user profiles associated with the collaborative document data object. Via the various steps/operations of the process 700, the document collaboration server computing device 106 can enable an end user profile of a client computing device 102A-C to generate temporal references while interacting with collaborative document user interfaces without the need to query associations between document administrator user profiles and collaborative document data objects, an approach that improves the computational load on document collaboration server systems 105 by reducing the number of end-user-initiated queries to the noted document collaboration server systems 105.

The process 700 begins at operation 701 when the document collaboration server computing device 106 transmits a collaborative document user interface data object associated with a collaborative document user interface for the collaborative document data object to a client computing device 102A-C. In some embodiments, the client computing device 102A-C is configured to generate the collaborative document user interface based on the collaborative document user interface data object and present the collaborative document user interface to an end user profile of the client computing device 102A-C.

In general, the collaborative document user interface data object may describe user interface data associated with the collaborative document user interface and enables the client computing device to display the collaborative document user interface (e.g., by executing one or more instructions defined by the collaborative document user interface data object). In some embodiments, the collaborative document user interface data object describes markup data associated with a collaborative document user interface, such as Hypertext Markup Language (HTML) data associated with a collaborative document user interface. Moreover, the collaborative document user interface may describe a user interface that is configured to display content data associated with a corresponding collaborative document data object and enable an end user profile of the client computing device to make one or more modifications (e.g., modify contents of and/or add comments to) the corresponding collaborative document data object. For example, the collaborative document user interface may be a web-based user interface, such as a web-based user interface that is generated based on HTML data associated with a collaborative document user interface data object.

An operational example of a user interface segment 900 of a collaborative document user interface is depicted in FIGS. 9A-6B. As depicted in FIGS. 9A-6B, the user interface segment 900 depicts a portion of the contents of a corresponding collaborative document data object, along with a comment to the corresponding collaborative document data object.

At operation 702, the document collaboration server computing device 106 receives, from the client computing device 102A-C, a temporal referential association data object. The temporal referential association data object may describe that an end user profile of the client computing device 102A-C has provided a predefined temporal referential input while interacting with a collaborative document user interface. For example, the temporal referential association data object may be a data packet transmitted by a client computing device to a document collaboration server computing device that describes that an end user of the client computing has, while interacting with a collaborative document user interface, entered an @disturb reference as a comment to the collaborative document user interface.

In some embodiments, the temporal referential association data object is generated by the client computing device 102A-C based on a predefined temporal referential input provided by the end user profile during an interaction of the end user profile with the collaborative document user interface. The predefined temporal referential input may be provided by the end user profile while interacting with a collaborative document user interface that is associated with a collaborative document data object. By providing the predefined temporal referential input while interacting with collaborative document user interface, the end user profile may be configured to describe that the end user profile seeks to reference a defined document administrator user profile associated with the collaborative document data object, where the association between the defined document administrator user profile and the collaborative document data object depends on a periodicity of a time associated with providing of the predefined cross-temporal referential input by the end user profile to the client computing device. An example of a predefined cross-temporal referential input is an "@disturb" text input that may describe that an end user profile seeks to references a document administrator user profile that is deemed to be responsible for a collaborative document data object for a particular day of a week.

In some embodiments, the predefined temporal referential input is associated with a cyclical time period designation. The cyclical time period designation may describe a group of time periods that are defined by a common periodicity of the group of time periods. For example, the cyclical time period designation may describe a group of time periods that are all deemed to fall on a particular day of the week or on particular days of the week. As another example, the cyclical time period designation may describe a group of time periods that are all deemed to fall on a particular day of the month or on particular days of the month. As yet another example, the cyclical time period designation may describe a group of time periods that are all deemed to fall on a particular week of the month or on particular weeks of the month.

An operational example of a predefined temporal referential input 901 is depicted in the user interface segment 900 of FIG. 9A. As depicted in FIG. 9A, the predefined temporal referential input 901 includes the text "@disturb". It should be noted that, in at least some embodiments, the text "@disturb" is depicted as "@disturb" before the user submits the text through a predefined action (e.g., through an enter keystroke, through a space keystroke, and/or the like), as submission of the text causes the text to be converted to an "@[user]" text, where user is the designated document administrator user profile for the temporal referential association data object as determined based on a cyclical time period designation of the predefined temporal referential input described by the temporal referential association data object. However, in some embodiments, the above-noted conversion does not take place, and @disturb reference merely causes inclusion of the temporal reference in a temporal reference repository of a designated document administrator user profile for the temporal referential association data object as determined based on a cyclical time period designation of the predefined temporal referential input described by the temporal referential association data object.

At operation 703, the document collaboration server computing device 106 queries a temporal referential mapping data object associated with the collaborative document data object to identify a designated temporal document administrator user profile of the group of document administrator user profiles for the cyclical time period designation. In some embodiments, the temporal referential mapping data object describes mappings between a group of cyclical time period designations and a group of document administrator user profiles. Accordingly, the temporal referential mapping data object may describe a designated document administrator user profile for each cyclical time period designation of a group of cyclical time period designations. For example, the temporal referential mapping data object may describe that: (i) @disturb references provided on Mondays are associated with the document administrator user profile U1, (ii) @disturb references provided on Mondays and Tuesdays are associated with the document administrator user profile U2, (iii) @disturb references provided on Wednesdays and Thursdays are associated with the document administrator user profile U3, and (iv) @disturb references provided on other days of the week are associated with the document administrator user profile U4.

At operation 704, the document collaboration server computing device 106 generates a temporal visual conversion data object based on the designated cross-temporal document administrator user profile. The temporal visual reference data object may describe a designated document administrator user profile associated with a predefined cross-temporal referential input described by a cross-temporal referential association data object. The client computing device 102A-C may be configured to generate a temporal reference user interface element based on the temporal visual reference data object and present the temporal reference user interface element to the end user profile as part of a collaborative document user interface. In some embodiments, the temporal visual reference data object describes markup data (e.g., HTML data) associated with a corresponding temporal reference user interface element.

At operation 705, the document collaboration server computing device 106 transmits the temporal visual conversion data object to the client computing device 102A-C. As described above, the client computing device 102A-C may be configured to generate a temporal reference user interface element based on the temporal visual reference data object and present the temporal reference user interface element to the end user profile as part of a collaborative document user interface. The temporal reference user interface element may be a user interface element that describes/depicts at least an "@[user]" text, where the user value may be a string value that is determined based on a textual identifier of a designated document administrator user profile described by the temporal visual reference data object. An operational example of a temporal reference user interface element is the "@David" text 911 depicted in the user interface segment 900 of FIG. 9B.

Exemplary Client-Side Operations for Temporal Referential Association

FIG. 8 is a flowchart diagram of an example process 800 for performing client-side operations needed to enable temporal referential association between a collaborative document data object and a group of document administrator user profiles associated with the collaborative document data object. Via the various steps/operations of the process 800, a client computing device 102A-C can interact with a document collaboration server computing device 106 in a manner that causes the document collaboration server computing device 106 to enable an end user profile of a client computing device 102A-C to generate temporal references while interacting with collaborative document user interfaces without the need to query associations between document administrator user profiles and collaborative document data objects, an approach that improves the computational load on document collaboration server systems 105 by reducing the number of end-user-initiated queries to the noted document collaboration server systems 105.

The process 800 begins at operation 801 when the client computing device 102A-C receives a collaborative document user interface data object from the document collaboration server computing device 106. In some embodiments, the client computing device 102A-C is configured to generate the collaborative document user interface based on the collaborative document user interface data object and present the collaborative document user interface to an end user profile of the client computing device 102A-C. The collaborative document user interface data object may describe user interface data associated with the collaborative document user interface and enables the client computing device to display the collaborative document user interface (e.g., by executing one or more instructions defined by the collaborative document user interface data object). In some embodiments, the collaborative document user interface data object describes markup data associated with a collaborative document user interface, such as Hypertext Markup Language (HTML) data associated with a collaborative document user interface.

At operation 802, the client computing device 102A-C generates and presents a collaborative document user interface to an end user profile of the client computing device 102A-C based on the collaborative document user interface data object. The collaborative document user interface may describe a user interface that is configured to display content data associated with a corresponding collaborative document data object and enable an end user profile of the client computing device to make one or more modifications (e.g., modify contents of and/or add comments to) the corresponding collaborative document data object. For example, the collaborative document user interface may be a web-based user interface, such as a web-based user interface that is generated based on HTML data associated with a collaborative document user interface data object.

At operation 803, the client computing device 102A-C receives a predefined temporal referential input from an end user profile of the client computing device 102A-C. The predefined temporal referential input may be provided by the end user profile while interacting with a collaborative document user interface that is associated with a collaborative document data object. By providing the predefined temporal referential input while interacting with collaborative document user interface, the end user profile may be configured to describe that the end user profile seeks to reference a defined document administrator user profile associated with the collaborative document data object, where the association between the defined document administrator user profile and the collaborative document data object depends at least in part on a periodicity of a time associated with providing of the predefined temporal referential input by the end user profile to the client computing device. An example of a predefined temporal referential input is an "@disturb" text input.

At operation 804, the client computing device 102A-C generates (e.g., based on the predefined temporal referential input and/or based on the cyclical time period designation of the predefined temporal referential input) a temporal referential association data object and transmits the temporal referential association data object to a document collaboration server computing device 106. The temporal referential association data object may describe that an end user profile of the client computing device 102A-C has provided a predefined temporal referential input while interacting with a collaborative document user interface. For example, the cross-temporal referential association data object may be a data packet transmitted by a client computing device to a document collaboration server computing device that describes that an end user of the client computing has, while interacting with a collaborative document user interface, entered an @disturb reference as a comment to the collaborative document user interface.

At operation 805, the client computing device 102A-C receives a temporal visual reference data object from the document collaboration server computing device 106. The temporal visual reference data object may describe a designated document administrator user profile associated with a predefined cross-temporal referential input described by a cross-temporal referential association data object. The client computing device 102A-C may be configured to generate a temporal reference user interface element based on the temporal visual reference data object and present the temporal reference user interface element to the end user profile as part of a collaborative document user interface. In some embodiments, the temporal visual reference data object describes markup data (e.g., HTML data) associated with a corresponding temporal reference user interface element.

At operation 806, the client computing device 102A-C generates a temporal reference user interface element based on the temporal visual reference data object. The temporal reference user interface element may be a user interface element that describes/depicts at least an "@[user]" text, where the user value may be a string value that is determined based on a textual identifier of a designated document administrator user profile described by the temporal visual reference data object. An operational example of a temporal reference user interface element is the "@David" text 911 depicted in the user interface segment 900 of FIG. 9B.

At operation 807, the client computing device 102A-C presents the temporal reference user interface element to an end user profile of the client computing device 102A-C. In some embodiments, the client computing device 102A-C updates the collaborative document user interface to display the temporal reference user interface element in a segment of the collaborative document user interface that corresponds to the predefined temporal referential input.

FIG. 11 depicts an operational example of a collaborative document user interface 1100 that depicts, as part of an in-line comment, the temporal reference user interface element 1101 and, as part of a document-related comment, the cross-temporal reference user interface element 1102. In the collaborative document user interface 1100, user interaction with user interface element 1103 enables clicking on a button that enables viewing the document metadata user interface 1200 of FIG. 12. As depicted in FIG. 12, the document metadata user interface 1200 of FIG. 12 displays (among other things): (i) a set of associations between a set of predefined cross-temporal referential inputs and a set of corresponding document administrator user profiles, using the user interface segment 1201; (ii) a set of associations between a set of cyclical time period designations and a set of corresponding document administrator user profiles, using the user interface segment 1202; (iii) document revision history data using the user interface segment 1203; (iv) document label data using the user interface segment 1204; and (v) document hierarchy data using the user interface segment 1205.

Exemplary Techniques Related to Administrator Panel User Interfaces

In some embodiments, the document collaboration server computing device 106 is configured to: receive, from an administrator computing device associated with the designated cross-temporal document administrator user profile of the group of document administrator user profiles, an administrator panel user interface presentation request; generate an administrator panel user interface data object, wherein the administrator panel user interface data object is configured to enable presenting an administrator panel user interface that describes one or more cross-temporal document references for the designated cross-temporal document administrator user profile using a cross-temporal reference tab of the administrator panel user interface; and transmit the administrator panel user interface data object to the administrator computing device, wherein the administrator computing device is configured to present the administrator panel user interface based on the administrator panel user interface data object. In some embodiments, the administrator panel user interface describes one or more temporal document references for the designated cross-temporal document administrator user profile using a temporal reference tab of the administrator panel user interface. In some embodiments, each cross-temporal document reference of the one or more cross-temporal document references is associated with a reference label (e.g., a hashtag) of one or more reference labels, and the cross-temporal reference tab is configured to enable filtering the one or more cross-temporal document references based on the one or more reference labels.

In some embodiments, the document collaboration server computing device 106 is configured to: receive, from an administrator computing device associated with the designated cross-temporal document administrator user profile of the group of document administrator user profiles, an administrator panel user interface presentation request; generate an administrator panel user interface data object, wherein the administrator panel user interface data object is configured to enable presenting an administrator panel user interface that describes one or more temporal document references for the designated cross-temporal document administrator user profile using a temporal reference tab of the administrator panel user interface; and transmit the administrator panel user interface data object to the administrator computing device, wherein the administrator computing device is configured to present the administrator panel user interface based on the administrator panel user interface data object. In some embodiments, the administrator panel user interface describes one or more temporal document references for the designated cross-temporal document administrator user profile using a temporal reference tab of the administrator panel user interface. In some embodiments, each temporal document reference of the one or more temporal document references is associated with a reference label (e.g., a hashtag) of one or more reference labels, and the temporal reference tab is configured to enable filtering the one or more temporal document references based on the one or more reference labels.

An administrator panel user interface may be configured to display administrator data associated with a corresponding collaborative document data object and enable an end user profile of the client computing device to make one or more modifications to the corresponding administrator data. For example, the collaborative document user interface may be a web-based user interface, such as a web-based user interface that is generated based on HTML, data associated with an administrator panel user interface data object. In some embodiments, an administrator panel user interface describes one or more cross-temporal document references for the corresponding document administrator user profile using a cross-temporal reference tab of the administrator panel user interface. In some embodiments, an administrator panel user interface describes one or more temporal document references for the corresponding document administrator user profile using a temporal reference tab of the administrator panel user interface.

An operational example of an administrator panel user interface 1000 is depicted in FIG. 10. As depicted in FIG. 10, the administrator panel user interface 1000 includes a cross-temporal reference tab 1001 and a temporal reference tab 2. As further depicted in FIG. 10, the cross-temporal reference tab 1001 displays a set of cross-temporal references for a corresponding document administrator user profile. As further depicted in FIG. 10, the administrator panel user interface 1000 includes the user interface element 1003 that includes filtering references (e.g., cross-temporal references, temporal references, and/or the like) based on reference labels.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for temporally dynamic referential association between a respective collaborative document data object and a plurality of document administrator user profiles associated with the respective collaborative document data object, the apparatus comprising at least one processor and at least one memory including program code, the at least one memory and the program code configured to, with the at least one processor, cause the apparatus to at least:
    generate, based on a collaborative document data object received from a document collaboration server system, a collaborative document user interface;
    transmit, to the document collaboration server system, a cross-temporal referential association data object, wherein the cross-temporal referential association data object is generated based in part on a predefined cross-temporal referential input generated by an end user profile associated with the collaborative document user interface;
    receive, from the document collaboration server system and based on the cross-temporal referential association data object, a cross-temporal visual reference data object associated with a designated cross-temporal document administrator user profile; and
    generate, based on the cross-temporal visual reference data object, a cross-temporal reference user interface element.

2. The apparatus of claim 1, wherein the designated cross-temporal document administrator user profile is associated with the collaborative document data object, and wherein the association between the designated cross-temporal document administrator user profile and the collaborative document data object is a permanent association.

3. The apparatus of claim 1, wherein the predefined cross-temporal referential input is characterized by at least one of a specific alphanumeric character, special character, or a combination of specific alphanumeric characters and special characters.

4. The apparatus of claim 1, wherein the predefined cross-temporal referential input is associated with a first predefined cross-temporal referential input type designation of one or more predefined cross-temporal referential input type designations.

5. The apparatus of claim 4, wherein the at least one memory and the program code configured are configured to, with the at least one processor, further cause the apparatus to:
generate a cross-temporal referential mapping modification request, wherein the cross-temporal referential mapping modification request defines a new designated cross-temporal document administrator user profile of a group of document administrator user profiles for the first predefined cross-temporal referential input type designation; and
transmit, to the document collaboration server system, the cross-temporal referential mapping modification request.

6. The apparatus of claim 1, wherein the at least one memory and the program code configured are configured to, with the at least one processor, further cause the apparatus to:
receive, from the document collaboration server system, a cross-temporal visual conversion data object, and
update, based on the cross-temporal visual conversion data object, the collaborative document user interface by converting the predefined cross-temporal referential input to an indication of the designated cross-temporal document administrator user profile.

7. The apparatus of claim 1, wherein the at least one memory and the program code configured are configured to, with the at least one processor, further cause the apparatus to:
cause display, via the collaborative document user interface, of the cross-temporal reference user interface element as part of a comment data object, wherein the comment data object is associated with a first comment data object type of one or more comment data object types associated with the collaborative document user interface.

8. The apparatus of claim 7, wherein the one or more comment data object types comprise at least one of an in-line comment data object type or a document-related comment data object type.

9. A computer-implemented method for temporally dynamic referential association between a respective collaborative document data object and a plurality of document administrator user profiles associated with the respective collaborative document data object, the computer-implemented method comprising:
generating, based on a collaborative document data object received from a document collaboration server system, a collaborative document user interface;
transmitting, to the document collaboration server system, a cross-temporal referential association data object, wherein the cross-temporal referential association data object is generated based in part on a predefined cross-temporal referential input generated by an end user profile associated with the collaborative document user interface;
receiving, from the document collaboration server system and based on the cross-temporal referential association data object, a cross-temporal visual reference data object associated with a designated cross-temporal document administrator user profile; and
generating, based on the cross-temporal visual reference data object, a cross-temporal reference user interface element.

10. The computer-implemented method of claim 9, wherein the designated cross-temporal document administrator user profile is associated with the collaborative document data object, and wherein the association between the designated cross-temporal document administrator user profile and the collaborative document data object is a permanent association.

11. The computer-implemented method of claim 9, wherein the predefined cross-temporal referential input is characterized by at least one of a specific alphanumeric character, special character, or a combination of specific alphanumeric characters and special characters.

12. The computer-implemented method of claim 9, wherein the predefined cross-temporal referential input is associated with a first predefined cross-temporal referential input type designation of one or more predefined cross-temporal referential input type designations.

13. The computer-implemented method of claim 12, wherein the computer-implemented method further comprises:
generating a cross-temporal referential mapping modification request, wherein the cross-temporal referential mapping modification request defines a new designated cross-temporal document administrator user profile of a group of document administrator user profiles for the first predefined cross-temporal referential input type designation; and
transmitting, to the document collaboration server system, the cross-temporal referential mapping modification request.

14. The computer-implemented method of claim 9, wherein the computer-implemented method further comprises:
receiving, from the document collaboration server system, a cross-temporal visual conversion data object, and
updating, based on the cross-temporal visual conversion data object, the collaborative document user interface by converting the predefined cross-temporal referential input to an indication of the designated cross-temporal document administrator user profile.

15. The computer-implemented method of claim 9, wherein the computer-implemented method further comprises:
causing display, via the collaborative document user interface, of the cross-temporal reference user interface element as part of a comment data object, wherein the comment data object is associated with a first comment data object type of one or more comment data object types associated with the collaborative document user interface.

16. The computer-implemented method of claim 15, wherein the one or more comment data object types comprise at least one of an in-line comment data object type or a document-related comment data object type.

17. A computer program product for temporally dynamic referential association between a respective collaborative document data object and a plurality of document administrator user profiles associated with the respective collaborative document data object, the computer program product comprising at least one non-transitory computer-readable storage medium having computer-readable program code portions stored therein, the computer-readable program code portions configured to:
generate, based on a collaborative document data object received from a document collaboration server system, a collaborative document user interface;

transmit, to the document collaboration server system, a cross-temporal referential association data object, wherein the cross-temporal referential association data object is generated based in part on a predefined cross-temporal referential input generated by an end user profile associated with the collaborative document user interface;

receive, from the document collaboration server system and based on the cross-temporal referential association data object, a cross-temporal visual reference data object associated with a designated cross-temporal document administrator user profile; and generate, based on the cross-temporal visual reference data object, a cross-temporal reference user interface element.

18. The computer program product of claim 17, wherein the designated cross-temporal document administrator user profile is associated with the collaborative document data object, and wherein the association between the designated cross-temporal document administrator user profile and the collaborative document data object is a permanent association.

19. The computer program product of claim 17, wherein the predefined cross-temporal referential input is characterized by at least one of a specific alphanumeric character, special character, or a combination of specific alphanumeric characters and special characters.

20. The computer program product of claim 17, wherein the predefined cross-temporal referential input is associated with a first predefined cross-temporal referential input type designation of one or more predefined cross-temporal referential input type designations.

* * * * *